(12) United States Patent
Hamamura et al.

(10) Patent No.: US 6,728,595 B2
(45) Date of Patent: Apr. 27, 2004

(54) NUMERICAL CONTROLLER AND NUMERICAL CONTROL METHOD FOR NC MACHINE TOOLS

(75) Inventors: Minoru Hamamura, Shizuoka-ken (JP); Jun Fujita, Shizuoka-ken (JP); Kazuhiro Shiba, Shizuoka-ken (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 6 days.

(21) Appl. No.: 10/176,134

(22) Filed: Jun. 21, 2002

(65) Prior Publication Data

US 2003/0004605 A1 Jan. 2, 2003

(30) Foreign Application Priority Data

Jun. 22, 2001 (JP) ...................... P2001-189800

(51) Int. Cl.$^7$ .............................................. G06F 19/00
(52) U.S. Cl. .................. 700/188; 700/110; 700/95; 700/129; 700/97; 700/108
(58) Field of Search ................. 700/110, 108, 700/95, 97, 129, 188

(56) References Cited

U.S. PATENT DOCUMENTS

| | | | | |
|---|---|---|---|---|
| 3,596,153 A | * | 7/1971 | Brainard et al. | 318/574 |
| 4,178,820 A | * | 12/1979 | Gerber | 83/13 |
| 5,077,507 A | * | 12/1991 | Mitani et al. | 318/569 |
| 5,200,680 A | * | 4/1993 | Sasaki et al. | 318/571 |
| 5,544,046 A | * | 8/1996 | Niwa | 700/159 |
| 5,723,962 A | * | 3/1998 | Mizukami et al. | 318/571 |
| 5,902,077 A | * | 5/1999 | Halder | 408/9 |
| 6,438,573 B1 | * | 8/2002 | Nilsen | 709/100 |
| 6,597,968 B2 | * | 7/2003 | Matsumoto et al. | 700/188 |

FOREIGN PATENT DOCUMENTS

| | | |
|---|---|---|
| JP | 4-245505 | 9/1992 |
| JP | 8-126938 | 5/1996 |

\* cited by examiner

*Primary Examiner*—Leo Picard
*Assistant Examiner*—Michael D. Masinick
(74) *Attorney, Agent, or Firm*—Finnegan, Henderson, Farabow, Garrett & Dunner, L.L.P.

(57) ABSTRACT

A feed velocity of a control axis and acceleration thereof do not exceed a maximum feed velocity and a maximum acceleration defined in mechanical specifications even if a radial operation is carried out for the purpose of a cut-in or escape operation in a contour describing control. A radial permissible maximum velocity (Vnp) and a radial permissible maximum acceleration ($_\alpha$np) in a contour describing control using a circular interpolation is set separately from a setting value of a maximum feed velocity (Vm) of a control axis and that of a maximum acceleration ($_\alpha$m) thereof set as mechanical specifications, and when a command of the circular interpolation is given, limitations are given to a radial velocity (Vn) and acceleration ($_\alpha$n) so that the radial velocity (Vn) and acceleration ($_\alpha$n) do not exceed the radial permissible maximum velocity (Vnp) and permissible maximum acceleration ($_\alpha$np).

14 Claims, 15 Drawing Sheets

__US 6,728,595 B2__

NUMERICAL CONTROLLER AND NUMERICAL CONTROL METHOD FOR NC MACHINE TOOLS

BACKGROUND OF THE INVENTION

1. Field of the Invention

The present invention relates in general to an NC (Numerical Control) machine tool numerical controller and numerical control method, and in particular, to a numerical controller and a numerical control method for numerical control machine tools performing an orbit control.

2. Description of the Related Art

Recent years have observed the development (Japanese Patent No-3093935) of a turning operation method as a turning operation method for NC machine tools, in which a boring bat (tool) mounted on a spindle is controlled to always be oriented in a radial direction (normal direction) of circular arc by the synchronization of a circular interpolatory movement of a center of the spindle on a plane perpendicular to the spindle and a rotational movement of the spindle, to execute a boring process. This turning operation method, called orbit boring from the mode of movement, is advantageous in that the boring of an arbitrary hole size can be performed with a single boring bar.

The NC machine has controlled axes, which have their maximum feed speeds and maximum accelerations factory-set to be adequate. Disclosed techniques (Japanese Patent Application Laying-Open Publication No. 4-245505) teach limiting the feed speed of controlled axis within a prametrically set maximum feed speed.

As orbit boring takes a radial movement as a cut-in or escape action during operation, with a resultant combination between a feed speed of circular interpolatory movement (as an orbital motion speed) and a feed speed for the cut-in or escape action (as a radial spend), if the orbital motion speed exceeds a certain given value, an associated axis may undergo excessive feed speed or acceleration over a factory-set upper limit.

Controlled axis with an excessive feed speed or acceleration over a factory-set upper limit may suffer from, for example, a torque saturation phenomenon with a resultant lost of control, or an excessive error over a permissible value with a failure to perform a conforming process within a permissible range of precision.

The issue described likely appears not simply in the orbit boring, but also in a contour processing by ordinary circular interpolation, when the feed speed of controlled axis is increased for high-speed operation, with a failure to perform a conforming process within a permissible range of precision required therefore.

SUMMARY OF THE INTENTION

The present invention has been made to solve problems described. It therefore is an object of the present invention to provide a numerical controller and a numerical control method for NC machine tools adapted, in a control that accompanies a circular interpolation, such as in an orbit boring, even when making a radial motion to take a cut-in or escape action, so that feed velocity or acceleration of controlled axis is kept from exceeding a factory-set maximum feed velocity or acceleration, ensuring a conforming process to be performed within a permissible range of precision.

To achieve the object, an aspect of the invention provides a numerical control method for NC machine tools to perform a contour describing control, comprising: calculating a permissible range of a physical index representing one of a velocity and an acceleration of a tool; and controlling the physical index within the permissible range.

Further, to achieve the object, another aspect of the invention provides a numerical controller for NC machine tools to perform a contour describing control, comprising: a calculator for calculating a permissible range of a physical index representing one of a velocity and an acceleration of a tool; and a controller for controlling the physical index within the permissible range.

BRIEF DESCRIPTION OF THE DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
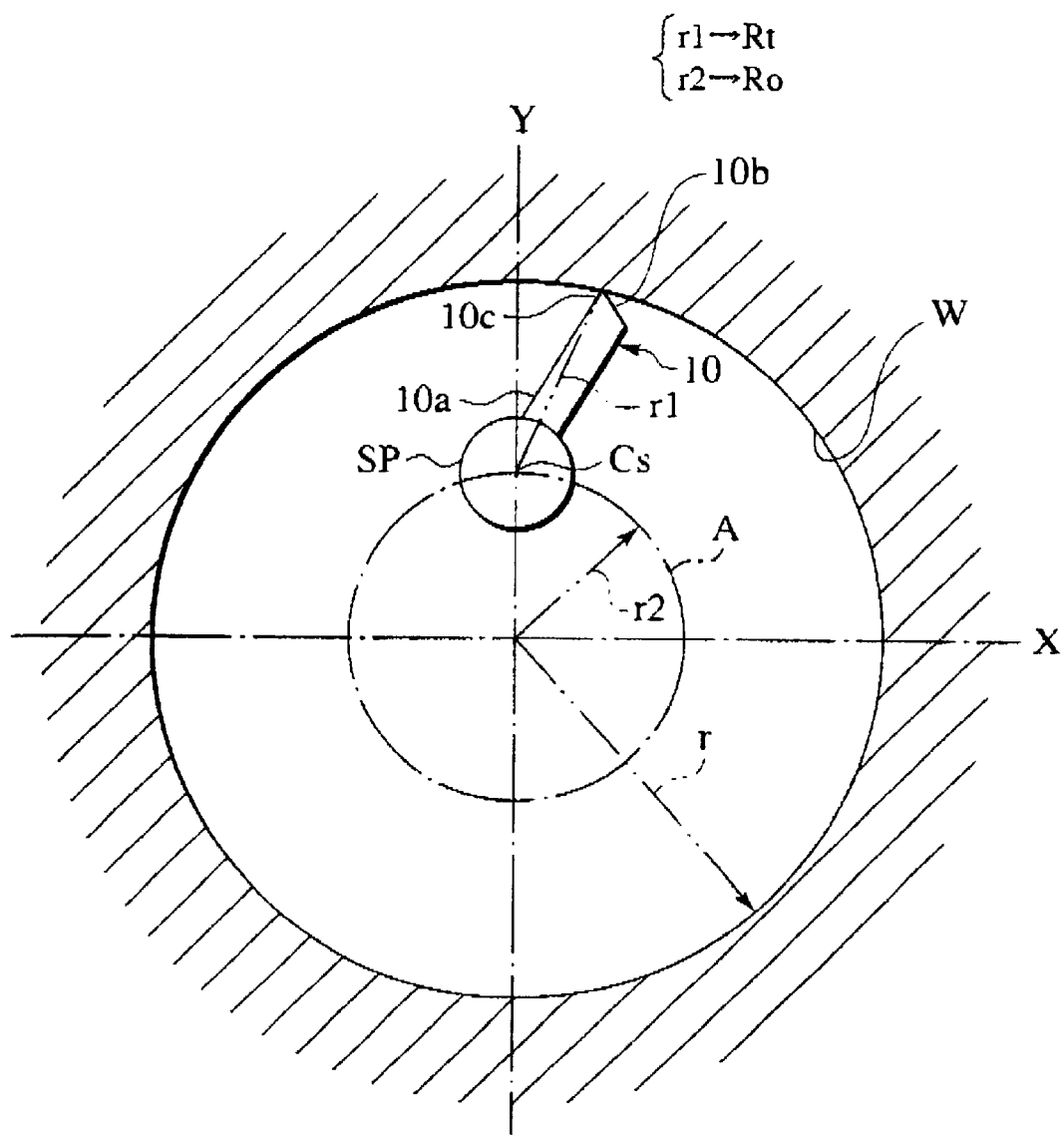
FIG. 1 is a schematic diagram of an orbit boring.

There will be described below the preferred embodiments of the present invention, with reference to the accompanying drawings, in which like elements or members awe designated by like reference characters.

Figure 13:
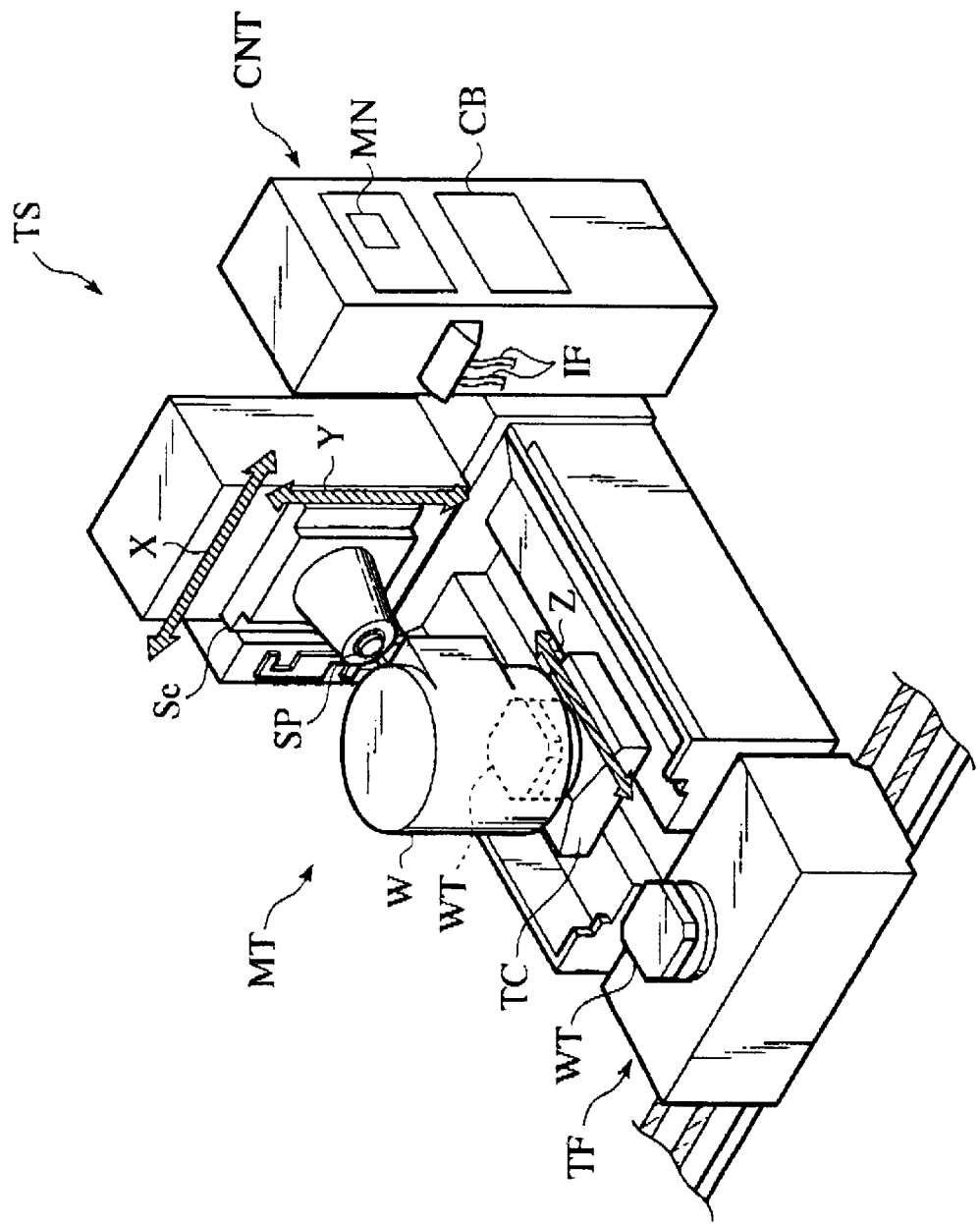
FIG. 13 is a perspective view of an NC machine tool system equipped with a numerical controller according to an embodiment of the invention.

FIG. 13 illustrates an NC machine tool system TS equipped with a numerical controller CNT according to an embodiment of the invention. The NC machine tool system TS includes an NC machine tool MT having an X-Y-Z orthogonal coordinate system fixed thereto, the numerical controller CNT for providing NC control signals to drives (a spindle rotating servo motor, a combination of X-feed and Y-feed servo motors, and a Z-feed servo motor or linear motor) of the machine tool MT, and a table forwarder TF for forwarding a work table WT with a work W fixed thereon to be set in position to the machine tool MT.

The machine tool MT has a table carrier TC for carrying the table WT with the work W thereon to displace in a machine-longitudinal Z-axis direction, and a spindle carrier SC for carrying a spindle SP held thereto to displace in a machine-transverse X-axis direction and a vertical Y-axis direction. The numerical controller CNT has a touch-panel monitor MN, a control board CB, and data interfaces IF to the machine tool MT and an associated computer network.

Figure 14A:
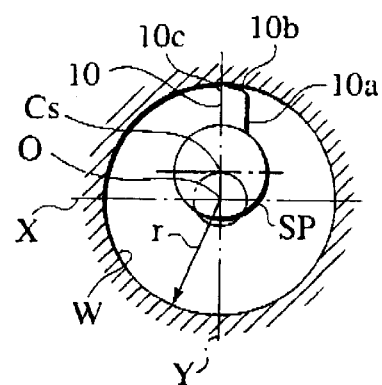
FIG. 14A and FIG. 14B are diagrams illustrating an orbit boring in the NC machine tool system of FIG. 13.
Figure 14B:
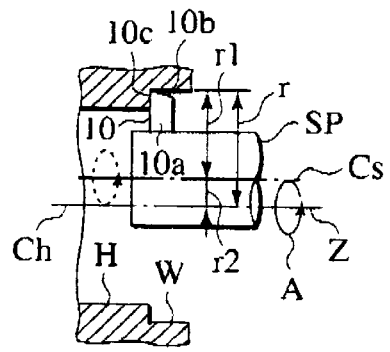

FIG. 14A and FIG. 14D illustrate a cutting tool 10 (as a byte or boring bar) mounted to the spindle SP for an orbit boring to be performed in the NC machine tool system of FIG. 13. FIG. 14A is a cross section, and FIG. 14B is a longitudinal section.

As illustrated in these figures, the tool 10 is fixed at a proximal end 10a thereof to a cylindrical body of the spindle SP, and extends in a projecting manner with a slight inclination to a radial direction of the spindle SP, to have, on a front side at a distal end 10b thereof, a cutting edge 10b located at a predetermined distance r1 (as a tool rotation radius) with respect to an axis Cs or axial center of the spindle SP. As the spindle SP is rotated about the axis Cs, the tool 10 as well as the cutting edge 10c is rotated thereabout in a rotational direction shown by broken lines in the figures.

The work W is formed with a horizontal hole H to be bored, by the tool 10, with a diameter of 2 r, i.e., with a work machining radius r about an axial center Ch of the hole H. The center Ch of the hole H is aligned to be coincident (as shown in FIG. 14B), or in parallel, with a Z axis of the X-Y-Z coordinate system in an imaginary NC control field of the machine tool MT. As shown in FIG. 14A, the X-Y-Z coordinate system has its origin O on the Z axis, where X and Y axes of the coordinate system intersects each other.

As the machining (boring) radius r is greater than the rotation radius r1 of the cutting edge 10c about the spindle axis Cs, this axis Cs is offset (in terms of being controlled to be positioned off) from the Z axis at a distance r2, where it is rotated with an orbit radius (i.e. the offset distance) r2 about the Z axis to describe a "locus (or a set of connected loci) A (forming a circle in this case)", called "interpolatory orbit (or locus)", or "imaginary orbit (or locus)", or "complementary orbit (Or locus)", to be similar to a bored inner circumference of the hole H, as shown by solid lines in the figures. The orbit radius r2 is calculated, such that r2=r−r1 in vector notation. The spindle axis Cs is thus controlled to describe the interpolatory orbit A, by synchronously controlling X and Y feeds of the spindle SP in consideration of a Z feed of the work W. As the Z feed as well as the position of imaginary Z axis is variable, apparent loci of the imaginary orbit A may provide a spiral, orbit, or certain spatial curve else than a circle.

Now, terms are defined; with exemplary reference to FIG. 13, and FIG. 14A and FIG. 14B. As used herein, the term:

"work" is a collective name of part (H), now concerned to be cut, of a work (W) set to be machined on a work table (WT) of an NC machine tool (MT), and is defined in NC control (at CNT) by a set of coordinates (X, Y, Z) of the position;

"tool supporting part" is a collective name of part of a spindle (SP) supporting a tool (10) of the NC machine tool (NT), and means in NC control (at CNT) a set of coordinates (X, Y, Z) of the center (Cs) of rotation of the tool (10) about an axis (Cs) of the spindle (SP);

"orbit" means a locus (so-called interpolation locus) (A) as a set of loci of a relative motion of the tool supporting pan (on Cs) with respect to the work (W), and is achieved in NC control (at CNT) by calculation and performance of relative movements (X, Y, Z feeds) between the work table (WT) and the tool supporting pan (on Cs) (e.g, circular interpolatory movement (A) therebetween);

"orbit machining" means an NC machining in which the orbit (A) to be described is intentionally programmed in advance, as a combination of orbit defining expressions and valued parameters therefor and/or data or accesses to obtain data to be processed to determine parametrical values therefor;

"orbit boring" means a boring (FIG. 14A, FIG. 14B) by the orbit machining in which the orbit (A) of the tool supporting part (on Cs) and the angle of rotation of the tool (10) about the axis (Cs) of the spindle (SP) art NC controlled, so that the tool (10) has a constant cutting angle to the work (W); and "contour describing control" means a control for the orbit machining in which the orbit (A) is controlled similar in shape to a contour with which the work (w) is to be machined.

It is noted that the present invention is embodied herein as an implementation of, but not limited to, one of:

(I) a contour describing control method in which:

a bite tool (10) is fixed to a spindle (SP) quantitatively controllable of an angle of rotation about an own center as an axis (Cs) thereof, projecting radially outward of the spindle (SP), the axis (Cs) of the spindle (SP) is caused to perform relative movements with a locus (A) to a work (W), as the spindle (SP) and the work (W) are relatively displaced by a control of two axes (X, Y) of an X-axis and a Y-axis, at least within an X-Y plane perpendicular to the axis (Cs) of rotation of the spindle (SP), along a machining surface of the work (W), making a mutual interpolatory motion to always keep constant a distance (r1) from the machining surface (H) of the work (W) to be machined to the axis (Cs) of the spindle (SP); and the angle of rotation of the spindle (SP) is controlled in synchronism with the axes (X, Y) control with a prescribed correlation, always holding constant an angle between a front side at a blade edge (10c) of the bite tool (10) and the machining surface (H) of the work (W) to be machined, achieving a cutting machining of a form with a curved surface depending on an interpolatory locus (A) defined by the mutual interpolatory motion; and (II) a contour describing control method in which:

a bite tool (10) is fixed to a spindle (SP) quantitatively controllable of an angle of rotation about an own center as an axis (Cs) thereof;

the axis (Cs) of the spindle is caused to perform relative movements with a locus (A) to a work (W), as the spindle (SP) and the work (W) are relatively displaced by an axis control of X and Y axes, at least within an X-Y plane perpendicular to the axis (Cs) of rotation of the spindle (SP), along a machining surface (H) of the work (W), making a mutual interpolatory motion to always keep constant a distance (r1) from the machining surface (H) of the work (W) to be machined to the axis (Cs) of the spindle (SP); and the angle of rotation of the spindle (SP) is controlled in synchronism with the (X, Y) axis control with a prescribed correlation, always holding constant an angle between a front side at a blade edge (10c) of the bite tool (10) and the machining surface (H) of the work (W) to be machined, at whole positions of the rotation angle of the spindle (SP), achieving a cutting machining of a form with a curved surface depending on an interpolatory locus (A) defined by the mutual interpolatory motion, wherein the (X, Y) axis control of the relative movements between the spindle (SP) and the work (W) is quantitatively corrected in dependence on a degree of an inclination of the machining surface (H) or a machining axis of the work (W) relative to the center as the axis (Cs) of the spindle (SP), thereby providing the mutual interpolatory motion between the spindle (SP) and the work (W) with a component of the inclination of the machining surface (H) or the machining axis of the work (W) relative to the center as the axis (Cs) of the spindle (SP), for cutting an inclined flange surface or an inner or outer peripheral surface.

FIG. 15A to FIG. 15K are diagrams illustrating various examples of the orbit machining to be performed by a contour describing control method (i.e. with a similar orbit to a machining contour), as the orbit boring or modifications thereof (i.e. having a constant cutting angle to a work), in the NC machine tool system TS of FIG. 13.

Figure 15A:
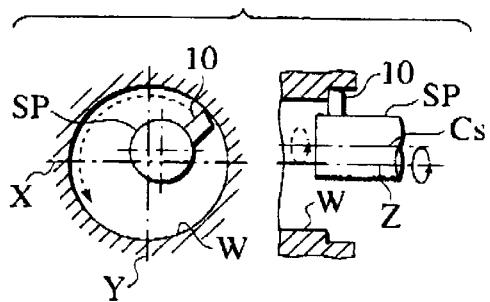
FIG. 15A to FIG. 15K are diagrams illustrating various examples of orbit machining, as the orbit boring or modifications thereof, in the NC machine tool system of FIG. 13
Figure 15B:
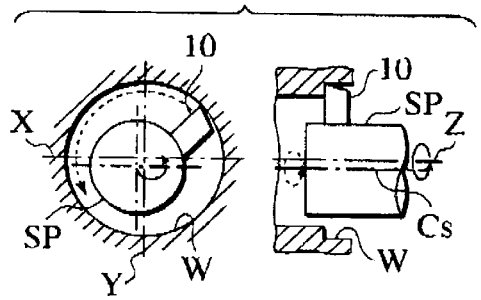
Figure 15C:
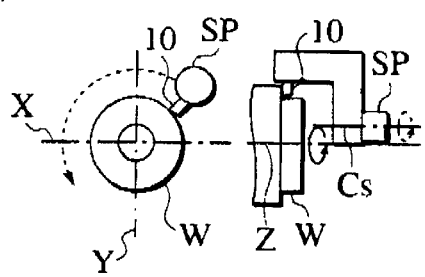
Figure 15D:
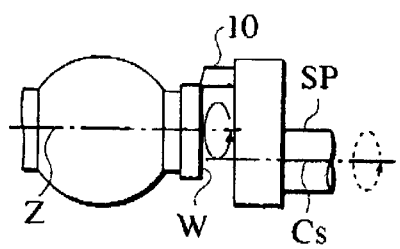
Figure 15E:
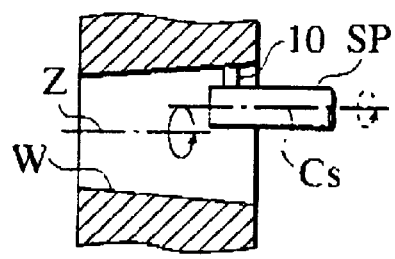
Figure 15F:
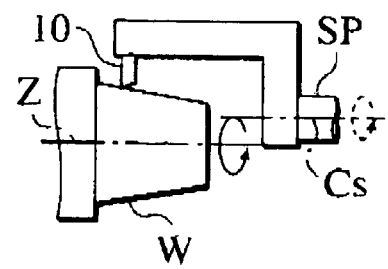
Figure 15G:
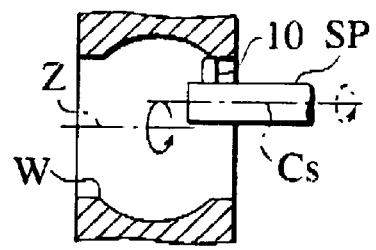
Figure 15H:
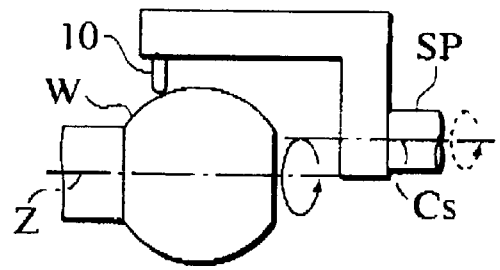
Figure 15I:
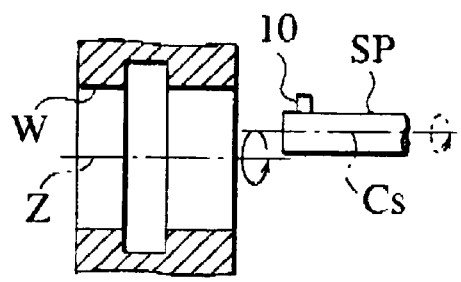
Figure 15J:
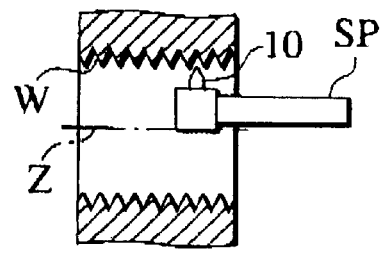
Figure 15K:
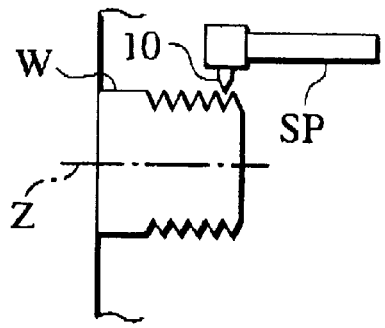

Illustrated in: FIG. 15A is an orbit boring by a bite tool 10 rotated with a spindle axis Cs offset on the same side of a Z axis, as r1<r, for cutting an inner periphery (emphasized by bold lines as in a respective example) of a work W to be bored, FIG. 15B is an orbit boring by a bite tool 10 rotated with a spindle axis Cs offset on the opposite side of a Z axis, as r1>r, for cutting an inner periphery of a work W to be bored;

FIG. 15C is an orbit machining by a bite tool 10, which radially inwardly extends from a distal end of an elbow jig mounted at a proximal end thereof to a spindle SP, and which is rotated by the spindle SP for cutting an outer periphery of a work W to determine an outside diameter thereof;

FIG. 15D is an orbit machining by a bite tool 10, which axially extends from a distal end of a radial offsetting jig mounted at a proximal end thereof to a spindle SP, and which is rotated by the spindle SP for cutting an end face of a flange of a work W;

FIG. 15E is an orbit machining by a bite tool 10 rotated for cutting a tapered inner periphery of a work W to determine an inside diameter thereof;

FIG. 15F is an orbit machining by a bite tool 10, which radially inwardly extends from a distal end of an axially elongate elbow jig mounted at a proximal end thereof to a spindle SP, and which is rotated by the spindle SP for cutting a tapered outer periphery of a work W to determine an outside diameter thereof;

FIG. 15G is an orbit machining by a bite tool 10 rotated for cutting a spherical inner periphery of a work W to determine an inside diameter thereof;

FIG. 15H is an orbit machining by a bite tool 10, which radially inwardly extends from a distal end of an axially elongate elbow jig mounted at a proximal end thereof to a spindle SP, and which is rotated by the spindle SP for cutting a spherical outer periphery of a work W to determine an outside diameter thereof;

FIG. 15I is an orbit machining by a bite tool 10 rotated for cutting a circumference of an annular slot of a work W;

FIG. 15J is an orbit machining by a bite tool 10, which radially outwardly extends from a support jig mounted to a spindle SP, and which is rotated by the spindle SP for cutting involutions of inside thread of a work W to determine an inside diameter thereof; and FIG. 15K is an orbit machining by 4 bite tool 10, which radially inwardly extends from a support jig mounted to a spindle SP, and which is rotated by the spindle SP for cutting involutions of outside thread of a work W to determine an outside diameter thereof.

The present invention is applicable, but not limited, to various modes of the orbit machining under contour describing control described with reference to FIG. 13 to FIG. 15K.

However, for the purpose of comprehension, the present embodiment is described, with reference to FIG. 1 (which corresponds to the orbit boring of inside diameter shown in FIG. 15A) and associated drawings FIG. 2 to FIG. 9. It is noted that in the following description the work machining radius r is represented by a capital letter R, and that in FIG. 1 the tool rotation radius r1 and the interpolatory orbit radius T2 are assumed to be Rt and Ro, respectively.

In the orbit boring, as the spindle SP is rotated at a controlled angle of rotation about the axis Cs and carried by the carrier SC (FIG. 13) undergoing relative X and Y feeds, the spindle axis Cs is controlled by the X and Y feeds to make a circular interpolatory motion relative to the work W (on the table WT), in synchronism with a rotary motion of the spindle SP about the axis Cs, so that the tool 10 is always oriented in a normal direction of the circular interpolatory motion.

Along with the synchronous control, the spindle axis Cs describes a circular interpolatory locus (as the interpolatory orbit) A, having the tool 10 bore the work W with a machining radius of Rt+Ro, where Rt is a tool projection length (as a tool rotation radius) of the tool 10 with respect to the spindle axis Cs, and Ro is an orbit radius to describe the circular interpolatory orbit A.

The projection length (rotation radius) Rt of the tool 10 is invariable, as the tool 10 has a given length unchangeable until a physical replacement of the tool 10. But the orbit radius Ro is variable in accordance with a programmable command of an associated NC machining program in the numerical controller CNT (FIG. 13), thus allowing for the single tool 10 to perform a boring of work with an arbitrary machining radius Rt+Ro.

As the spindle SP makes an orbital motion along the interpolatory orbit A relative to the work W, it has n velocity (V) and an acceleration ($_\alpha$), which will be discussed with reference to FIG. 2

For simple discussion, the following legends are used herein:

V velocity at a tool supporting part on the axis Cs of the spindle SP making an orbital motion along the interpolatory orbit A, to be equivalent to a velocity (Vo) of an orbital feed on X-Y plane by the spindle carrier SC, if the axial component (V2) is insignificant.

Vt: tangential component of V, to be the feed speed for circular orbit.

Vtx: X component of Vt.

Vtm: factory-set maximum of Vt.

Vn; normal component of V, to be a radial component if Vz be insignificant, as a cut-In speed at the edge 10c of the tool 10.

Vnx: X component of Vn

Vnm: factory-set maximum of Vn.

Vnp; permissible maximum of Vn, to be set as a maximum rut-in speed.

Vx: X component of V, as an X-component sum of Vt and Vn, such that Vx=Vtx+Vnx.

Vxm: factory-set maximum of Vx.

Vm: factory-set maximum of V.

$_\alpha$: acceleration at the tool supporting part on the axis Cs of the spindle SP making the orbital motion along the interpolatory orbit A, to be equivalent to an acceleration ($_\alpha$o) of the orbital feed on X-Y plane by the spindle carrier SC, if the axial component ($_\alpha$2) is insignificant.

$_\alpha t$: tangential component of $_\alpha$, to be the feed acceleration for circular orbit.
  $_\alpha tx$: X component of $_\alpha t$.
  $_\alpha tm$: factory-set maximum of $_\alpha t$,
  $_\alpha n$: normal $_\alpha$, to be a radial component if $_\alpha z$ be insignificant,
    as a cut-in acceleration at the edge 10c of the tool 10.
  $_\alpha nx$: X component of $_\alpha n$.
  $_\alpha nm$: factory-set maximum of $_\alpha n$.
  $\alpha np$: permissible maximum of $_\alpha n$, to be set as a maximum cut-in acceleration.
  $_\alpha x$: X component of $_\alpha$,
    to be an X-component sum of $_\alpha t$ and $_\alpha n$, such that
  $_\alpha x = _\alpha tx + _\alpha nx$.
  $_\alpha xm$: factory-set maximum of $_\alpha x$.
  $_\alpha m$: factory-set maximum of $_\alpha$.
  $_\alpha o$: acceleration of an orbital feed on X-Y plane by the spindle carrier SC.
  $_\alpha ox$ (or $_\alpha X$): X component of $_\alpha o$, as an acceleration of X feed,
    to be equivalent to $_\alpha x$ if $_\alpha z$ be insignificant.
  $_\alpha oy$ (or $_\alpha Y$): Y component of $_\alpha o$, its an acceleration of Y feed, to be equivalent to $_\alpha y$ (Y component of $_\alpha$) if $_\alpha z$ be insignificant.
  θ: angle that the tool supporting part has about Z axis, relative to X axis.
  γ: angle at an arbitrary position on the orbit A.
  Ro: orbit radius, as a radius of curvature of the orbit A, to be constant if the orbit A is a single circle, but variable as the orbit A changes in radius and/or form.
  Rt: tool rotation radius, as an invariable radial tool length from the tool supporting part (on Cs) to the cutting edge 10c of tool 10.
  R: machining radius, as a vector sum of Rt and Ro, and variable, for example: for a spiral orbit, such that $$R_n = R_{n-1} + (\Delta R/360)\Delta\theta,$$

$$X_n = R_n \cos(\theta_{n-1} + \Delta\theta), \text{ and}$$

$$Y_n = R_n \sin(\theta_{n-1} + \Delta\theta),$$

where $R_n$ represents R at an n-th machining rotation,
  $X_n$ represents X at the n-th machining rotation,
  $Y_n$ represents Y at the n-th machining rotation,
  $R_{n-1}$ represents R at an (n−1)-th machining rotation,
  $\theta_{n-1}$ represents θ at the (n−1)-th machining rotation,
  ΔR is a variation of machining radius R per one rotation,
    to be "+" for increment, and
    "−" for decrement, and
  Δθ is a variation of angle θ, and/or
where this Δθ may be constant in a typical case; and for an elliptic orbit, such that $$R_n = (D_a/2)\cos\theta_n + (D_b/2)\sin\theta_n,$$

where Da is a long diameter of the elliptic orbit,
  Db is a short diameter of the elliptic orbit, and
  θn represents θ at the n-th machining rotation, and/or
where the velocity V may be constant in a typical case.

In general, at the numerical controller CNT, a "representative point P" of the tool supporting part on the axis Cs of the spindle SP is defined by a position vector p bound to the origin O of X-Y-Z coordinate system, such that $$p = \overline{OP} = \bar{p}(X,Y,Z) = Xi + Yj + Zk,$$

where i, j, and k are unit vectors extending along X, Y, and Z axes, and a travel distance s of the tool supporting part P along the interpolatory orbit A is calculated by integrating an increment ds (per time slot) of the travel distance s, such that $$s = \int_A ds = \int_{T=D}^{T=T} \sqrt{dX^2 + dY^2 + dZ^2}\, dT,$$

where dX, dY, and dZ are increments (per time slot) of X, Y, and Z feeds, and dT represents an interval of each programmed division slot of the time T.

The numerical controller CNT is thus adapted to analyze characteristics of a spatial curve to be described as the interpolatory orbit A, and determine characteristic parameters of the orbit A, as necessary, including:
  a tangential (unit) vector t to be calculated at the point P, such that
  $t = dp/ds = (dX/ds)i + (dY/ds)j + (dZ/ds)k$;
  a curvature κ to be calculated at the point P, such that $$\kappa = |dt/ds| = |d^2p/ds^2|$$
$$= \sqrt{(d^2X/ds^2)^2 + (d^2Y/ds^2)^2 + (d^2Z/ds^2)^2}\,;$$

a radius of curvature ρ to be calculated at the point P, such that
  $\rho = 1/\kappa$;
  a (principal) normal (unit) vector n to be calculated (as a unit vector perpendicular to the tangential vector t in an osculating plane) at the point P, such that $$n = \rho(dt/ds)$$
$$= (1/\kappa)(dt/ds)$$
$$= (1/\kappa)(d^2p/ds^2)$$
$$= \left(\frac{1}{\kappa}\frac{d^2X}{ds^2}\right)i + \left(\frac{1}{\kappa}\frac{d^2Y}{ds^2}\right)j + \left(\frac{1}{\kappa}\frac{d^2Z}{ds^2}\right)k;$$

a binormal (unit) vector b to be calculated (as a unit vector perpendicular to the normal vector n in a normal plane) at the point P, such that $$b = (t \times n)$$
$$= (dp/ds \times (1/\kappa)(d^2p/ds^2))$$
$$= (1/\kappa)(dp/ds \times d^2p/ds^2)$$
$$= \left\{\frac{1}{\kappa}\left(\frac{dY}{ds}\frac{d^2Z}{ds^2} - \frac{dZ}{ds}\frac{d^2Y}{ds^2}\right)\right\}i +$$
$$\left\{\frac{1}{\kappa}\left(\frac{dZ}{ds}\frac{d^2X}{ds^2} - \frac{dX}{ds}\frac{d^2Z}{ds^2}\right)\right\}j +$$
$$\left\{\frac{1}{\kappa}\left(\frac{dX}{ds}\frac{d^2Y}{ds^2} - \frac{dY}{ds}\frac{d^2X}{ds^2}\right)\right\}k,$$

where (t×n) represents an operator of outer product between vectors t and n; and a torsion $\tau$ such that $$\tau = |db/ds|$$

$$= \frac{1}{\kappa^2} \begin{vmatrix} \frac{dX}{ds} & \frac{dY}{ds} & \frac{dZ}{ds} \\ \frac{d^2X}{ds^2} & \frac{d^2Y}{ds^2} & \frac{d^2Z}{ds^2} \\ \frac{d^3X}{ds^3} & \frac{d^3Y}{ds^3} & \frac{d^3Z}{ds^3} \end{vmatrix}.$$

It will be seen that
db/ds=$-_\tau$n.
dt/ds=$_\kappa$n, and
dn/ds=$-_\kappa$t+$_\tau$b Further, the orbital motion of the tool supporting part P is generally defined by;
a velocity vector V such that V=Vt, where V (scalar)=ds/dT; and
an acceleration vector a such that $a=(dV/dT)t+\kappa V^2 n,$ which has
a tangential component $_\alpha$t such that
$_\alpha$t=dV/dT, and
a normal component $_\alpha$n such that
$_\alpha$n=$\kappa V^2$=$V^2/\rho$.

It is noted that both the velocity vector V and the acceleration vector a can be predicted by calculations based on programmed coordinate values and parametric values, and achieved through operations to associated data.

Thus predicted velocity vector V and acceleration vector a of an orbital motion of the tool supporting part P at an associated block of the orbit A are each respectively compared, in magnitude thereof (|V| or |a|) or in magnitude of any component thereof (such as Vt or Vn, or $\alpha$t or $\alpha$n) whichever is preferable in consideration of practice on the site, with a permissible range (such as under Vnp or $\alpha$np) that is predetermined or real-time calculated therefor on the basis of factory-set (or originally specified) maximum data (such as Vnm or $\alpha$nm) and/or associated operational and program block data and parameters, to check for excessive magnitudes to be corrected (slowed or decelerated at, for example, 21 of FIG. 3) to reside within the permissible range, by changing an NC interpolation command to be transmitted to a position controller (for example, 23, 24, 25, 26 of FIG. 3) of a respective associated axis (for example, spindle and X, Y, Z axes) to be controlled.

It is noted that, as a variety of conditions and/or requirements are considered, a resultant permissible range may be defined by a polygonal or polyhedron configuration such as in a linear programming system.

It also is noted that, as the tool 10 is fixed to the tool supporting part P, the orbital motion of this part P is considered representative of an orbital motion of the tool 10. If the projection length of tool 10 is significant, a motion of the cutting edge 10c associated with the orbital motion may be likewise checked and corrected, as that motion of the edge 10c is predictable from expressions described.

Description will be made of a comprehensive case in which significant is a radial (normal) action of the tool 10 to cut in the work W or escape therefrom.

Figure 2:
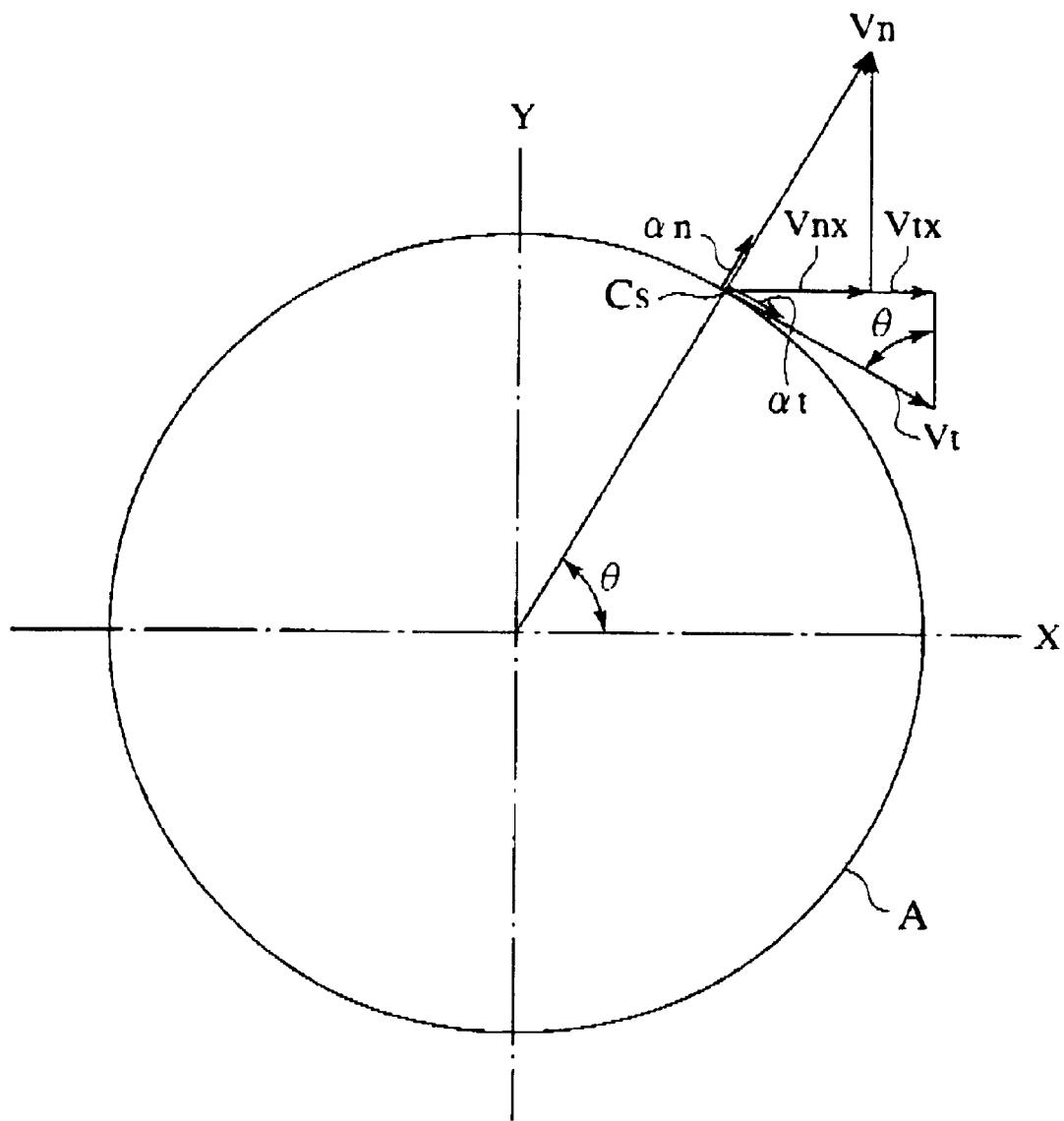
FIG. 2 is a velocity vector diagram of the orbit boring.

FIG. 2 illustrates relationship between a tangential component (tangential velocity, orbital velocity, or feed velocity) Vt and a normal component (normal velocity, radial velocity or cut-in velocity) Vn of a "velocity of an orbital motion" (V to be Vt when the orbit A is circular), and between a tangential component (tangential acceleration, orbital acceleration, or feed acceleration) $_\alpha$t and a normal component (normal acceleration, radial acceleration, or cut-in acceleration) $_\alpha$n of an "acceleration of the orbital motion" ($_\alpha$ to be $_\alpha$n=$-V^2$/Ro when the orbit A is circular). Letting Vtx be an "X component of the velocity Vt" (i.e. of a tangential movement of the tool supporting part P along the orbit A), Vnx be an "X component of the velocity Vn" (i.e. of a normal movement of the tool supporting part P in a radial direction of the orbit A), and $\theta$ be an angle from the X axis, it so follows that:

$$Vtx=Vt\sin\theta \qquad (1), \text{and}$$

$$Vnx=Vn\cos\theta \qquad (2).$$

Then, an "X component (Vx) of the velocity V" (sometimes called herein as X-axis synthetic velocity) is determined, such that:

$$Vx=Vtx+Vnx=Vt\sin\theta+Vn\cos\theta \qquad (3).$$

Likewise, an "X component ($_\alpha$x) of the acceleration $\alpha$" (sometimes called herein as X-axis synthetic acceleration) is determined, such that:

$$_\alpha x=_\alpha tx+_\alpha nx=_\alpha nx+(-Vt^2/Ro\cos\theta) \qquad (4).$$

The orbit boring should have no axis controlled with an excessive feed velocity or acceleration over a maximum velocity or maximum acceleration factory-set therefor, even if a radial movement is added for a cut-in or escape action. It therefore is necessary for the X-axis synthetic velocity Vx to be equal to or smaller than a factory-set maximum velocity Vxm of X feed and for the X-axis synthetic acceleration $_\alpha$x to be equal to or smaller than a factory-set maximum acceleration $_\alpha$xm of X feed, such that:

$$Vt\sin\theta+Vn\cos\theta \leq Vxm \qquad (5), \text{and}$$

$$_\alpha nx+(-Vt^2/Ro)\cos\theta \leq _\alpha xm \qquad (6).$$

As a result, a radial maximum velocity Vnm is given, such that:

$$Vnm=\{Vxm-Vt\sin\theta\}/\cos\theta \qquad (7).$$

As the factory setting is common between X and Y feeds, the angle $\theta$ may well be considered within a range of 0° to 90°. Differentiating expression (7) within this range, it so follows that:

$$dVnm/d\theta=\{Vxm\sin\theta-Vt\}/\cos^2\theta \qquad (8), \text{and}$$

$$d^2Vnm/d\theta^2=[Vxm\{1+\sin^2\theta\}-2Vt\sin\theta]/\cos^3\theta \qquad (9).$$

For expression (8) to be 0, $$\sin\theta=Vt/Vxm \qquad (10), \text{and}$$

$$\theta=\sin^{-1}(Vt/Vxm) \qquad (11).$$

Substituting this to expression (9), $$(Vxm^2-Vt^2)/Vxm \geq 0 \qquad (12).$$

Expressions (10) and (11) constitute conditions for limit values.

Accordingly, for a radial movement in cut-in action, the maximum velocity Vnm (mm/min) is calculated, letting Vim (mm/min) be a maximum tangential speed of orbital motion, and Vm be a factory-set maximum velocity of axis, such that:

$$\theta = \sin^{-1}(Vt/Vm) \quad (13), \text{ and}$$

$$Vnm = \{Vm - Vtm \sin\theta\}/\cos\theta \quad (14).$$

On the other hand as the interpolatory motion is circular, the X component of acceleration has an upper limit when $\theta=0$, such that:

$$_\alpha nx \leq _\alpha xm + Vt^2/Ro = _\alpha nm \quad (15).$$

Then, for a linear acceleration or deceleration, a time constant Tn of the acceleration or deceleration is given, such that:

$$Tn = Vxm/_\alpha nx \quad (16).$$

For example, in regard of the tangential maximum velocity Vtm of orbital motion by such an orbit boring command that feed velocity Vt=10000 mm/min, and orbit radius Ro=50 mm, if the factory-set maximum X-feed velocity Vxm=30000 mm/min and maximum X-feed acceleration $_\alpha xm=1$ m/sec$^2$, then in an orbit boring by the command the radial velocity has an upper limit (maximum velocity) calculated by expressions (13) and (14), such that:

$$\theta = \sin^{-1}(Vt/Vm) = 19.4°, \text{ and}$$

$$Vnm = \{30000 - 10000 \sin 19.4°\}/\cos 19.4° = \text{approx. } 28284 \, mm/min.$$

Moreover, it so follows, from expression (15), such that:

$$_\alpha nx \leq _\alpha xm + Vt^2/Ro = 0.44 \, m/sec2 = _\alpha nm, \text{ and}$$

from expression (16) for linear acceleration/deceleration time constant Tn, such that:

$$Tn = Vxm/_\alpha nx = \text{approx. } 1.13 \, sec.$$

Therefore, in order to prevent the control, axis feed velocity and acceleration from exceeding the factory-set maximum feed velocity and maximum acceleration, the on-site setting for the orbit boring with an interpolatory radius Ro=50 mm at a feed speed of 10000 mm/min should have a greater radial velocity Vn than 28284 mm/min and a shorter linear acceleration/deceleration time constant Tn than 1.13 sec.

Figure 3:
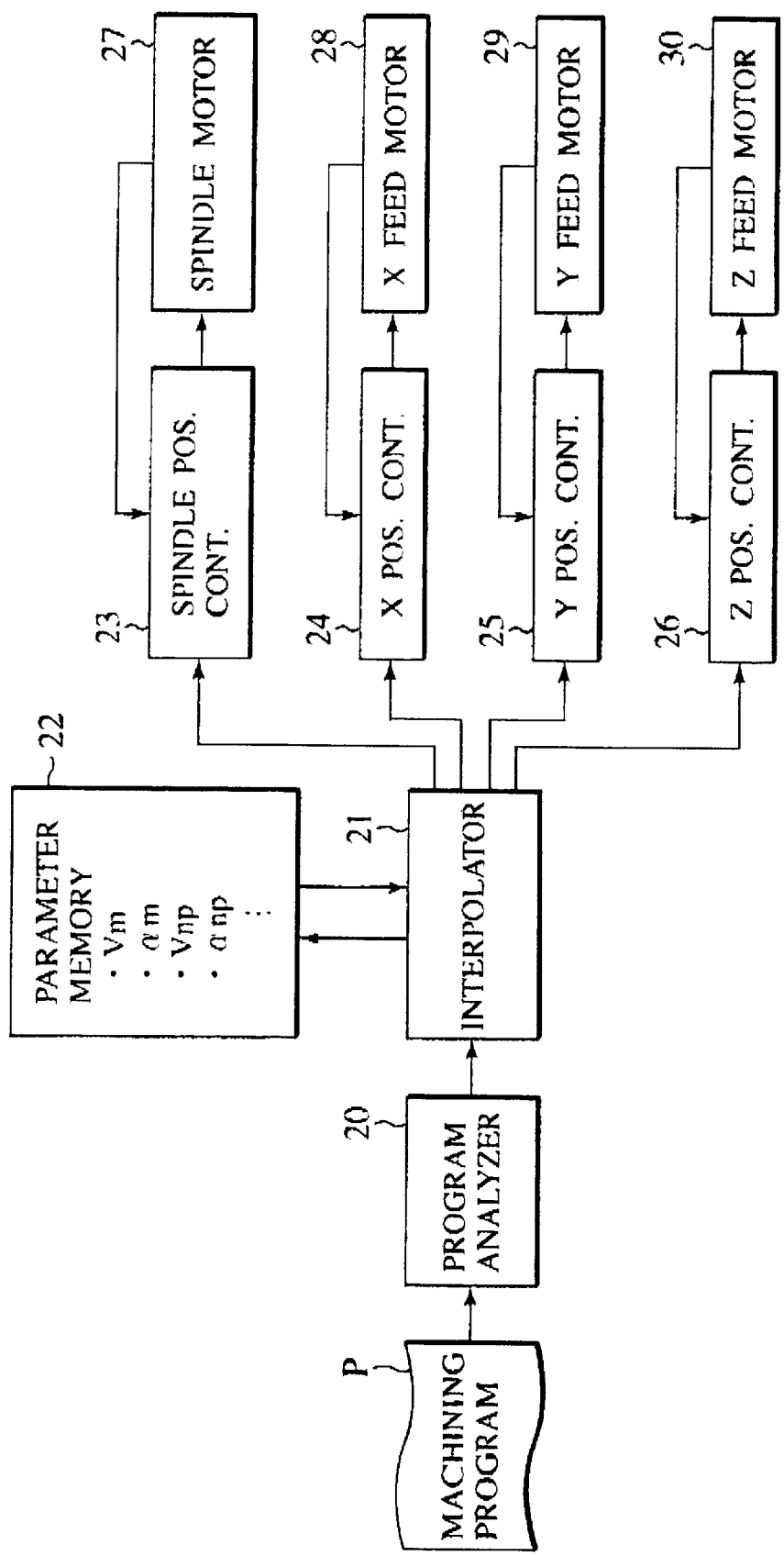
FIG. 3 is a block diagram of a numerical controller according to an embodiment of the invention.

FIG. 3 is a block diagram of the numerical controller CNT connected to servo motors of the NC machine tool MT. The numerical controller CNT includes a machining program analyzer 20 for analyzing an input machining program P to provide an interpolation data per each control block, an interpolator 21 for calculating a displacement for feed and a feed velocity of a respective axis from the interpolation data per each block, and a parameter memory 22 for storing various parameters and factory-set or preset maximum feed velocity Vm and maximum acceleration $_\alpha m$ of each control axis, as necessary parameters for interpolatory calculation. The numerical controller CNT is configured as a computer in which the machining program analyzer 20 and the interpolator 21 are implemented by execution of associated computer programs.

The interpolator 21 outputs a position command in terms of a velocity command to position controllers of the machine tool MT, that is, to respective position controllers 23, 24, 25 and 26 of spindle, X axis, Y axis, and Z axis in the case of orbit boring in concern. The respective position controllers 23, 24, 25 and 26 of spindle, X axis, Y axis and X axis are electrically connected to associated servo motors 27, 28, 29, and 30, respectively, for controlling them 27 to 30 to drive associated teed mechanisms.

The interpolator 21 basically generates a velocity command of each control axis within ranges of factory-set maximum feed velocity Vm and maximum acceleration $_\alpha m$ of the control axis, which are stored to be preset in the parameter memory 22. In other words, the interpolator 21 inherently has a limiter function, whereby the velocity command (i.e. position command) to be output to the position controller of each axis is limited within the ranges of maximum feed velocity Vm and maximum acceleration $_\alpha m$ as factory-set or site-set parameters.

In addition to this inherent function, the numerical controller CNT according to the embodiment of the invention previously calculates a radial maximum velocity Vnm and maximum acceleration $_\alpha nm$ at the orbit boring cut-in time, by described expressions, on bases of factor-set maximum feed velocity Vm and maximum acceleration $_\alpha m$ per control axis and upper limits of commanded feed velocity Vt and orbit radius Ro in orbit boring. Then, the numerical controller parametrically sets permissible radial maximum velocity Vnp (maximum cut-in speed setting) and permissible maximum acceleration $_\alpha np$ (maximum cut-in acceleration setting) in the orbit boring, which are calculated in consideration of a given safety ratio, and the maximum feed velocity Vnm and the maximum acceleration $_\alpha nm$, to the parameter memory 22, and provides limitations to the maximum cut-in speed and the maximum cut-in acceleration so as not to exceed the radial permissible maximum velocity Vnp and permissible maximum acceleration $_\alpha np$ in orbit boring.

This prevents the feed velocity of the control axis and the acceleration, thereof from exceeding the maximum feed velocity Vm and the maximum acceleration $_\alpha m$ on factory-set mechanical specifications even if the radial operation is carried out for the purpose of the cut-in or escape operation in orbit boring.

Figure 4:
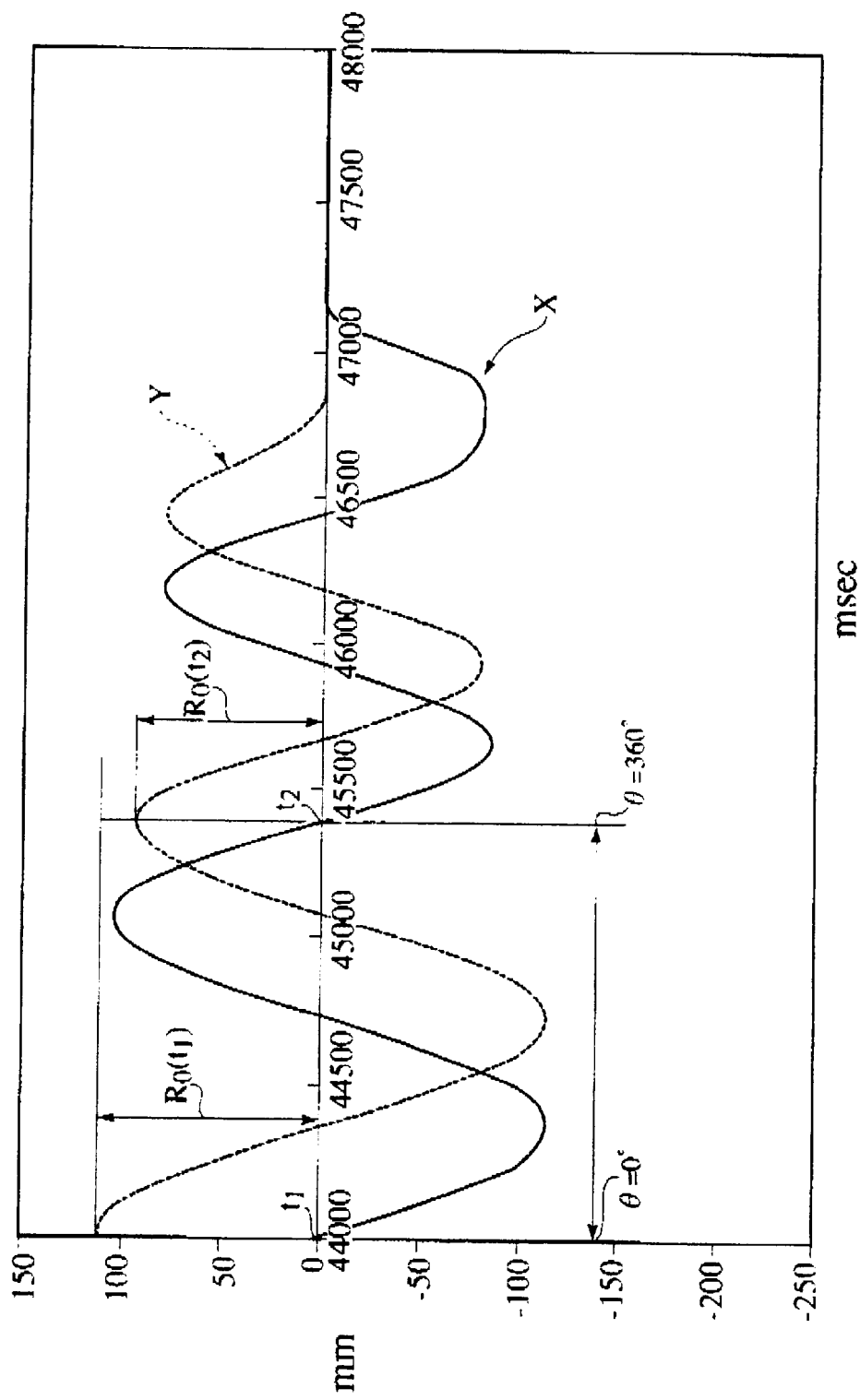
FIG. 4 is a graph showing, as waveforms, X-axis and Y-axis positions varying in the orbit boring.

FIG. 4 shows, as observed waveforms, time-dependent variations of X-axis and Y-axis positions of a tool supporting part P undergoing X and Y feeds for an orbit boring in which the interpolatory orbit A is shifted from a circular to a spiral, such that orbit radius Ro is changed from Ro(t1) to Ro(t2) within a cycle (time t1 to time t2), without limitation according to the embodiment.

Figure 5:
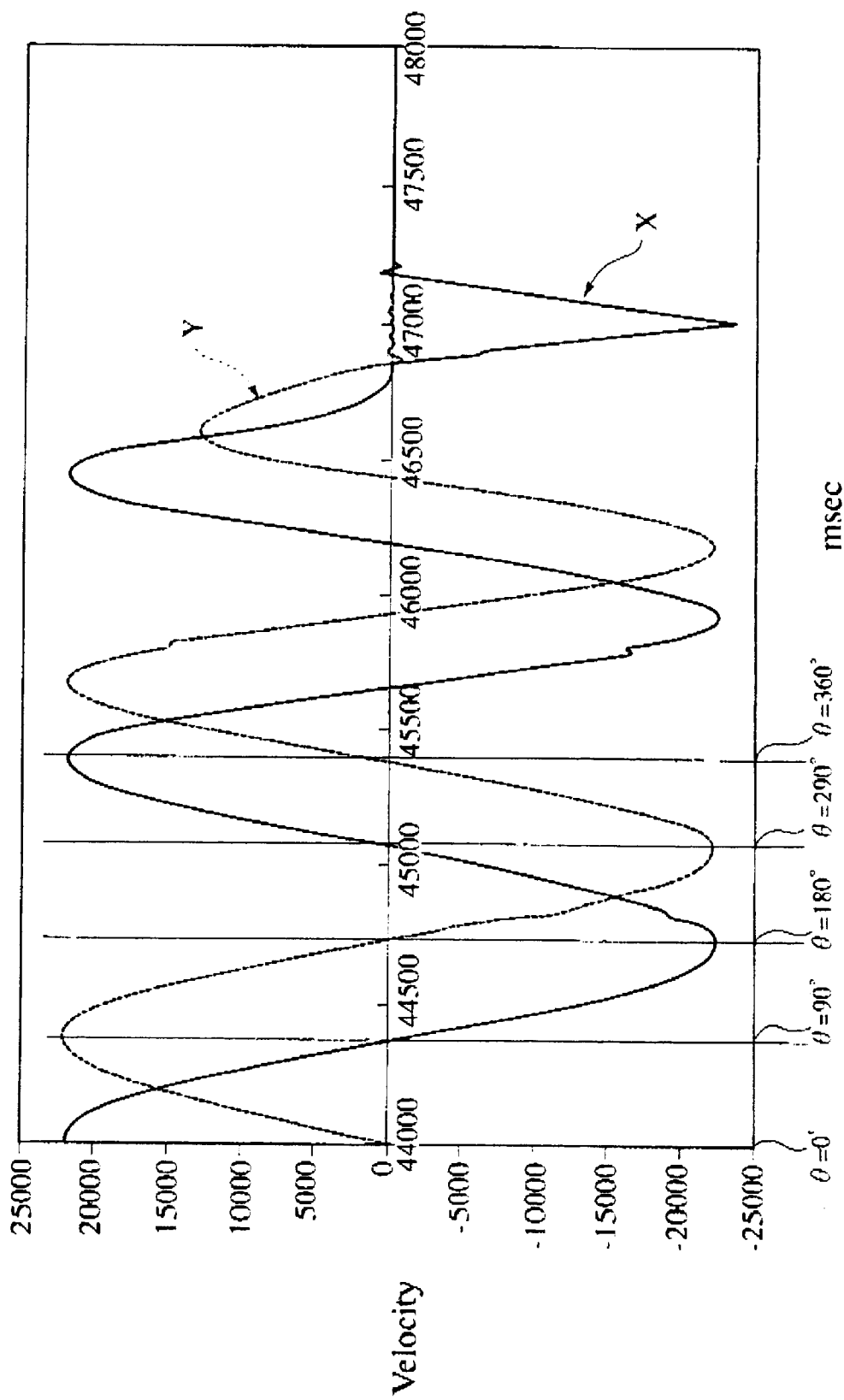
FIG. 5 is a graph showing, as waveforms, X-axis and Y-axis velocities varying in the orbit boring.

FIG. 5 shows, as observed waveforms, time-dependent variations of velocities of the X and Y feeds of FIG. 4.

Figure 6:
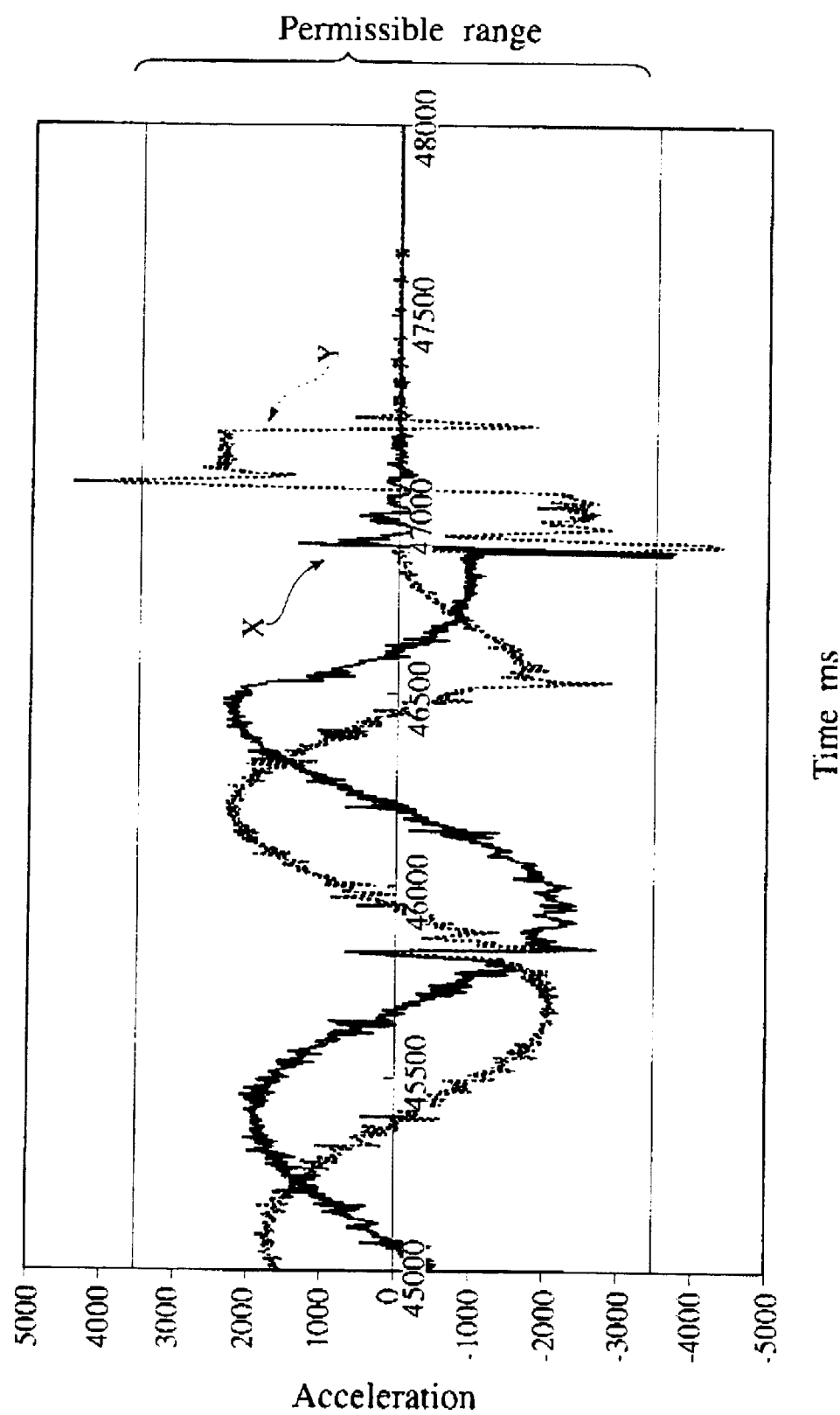
FIG. 6 is a graph showing, as waveforms, varying accelerations before limiting a maximum cut-in speed and a maximum cut-in acceleration in the orbit boring.

FIG. 6 shows, as observed waveforms, time-dependent variations of accelerations of the X and Y feeds of FIG. 4. Respective waveforms exceeded it permissible range.

Figure 7:
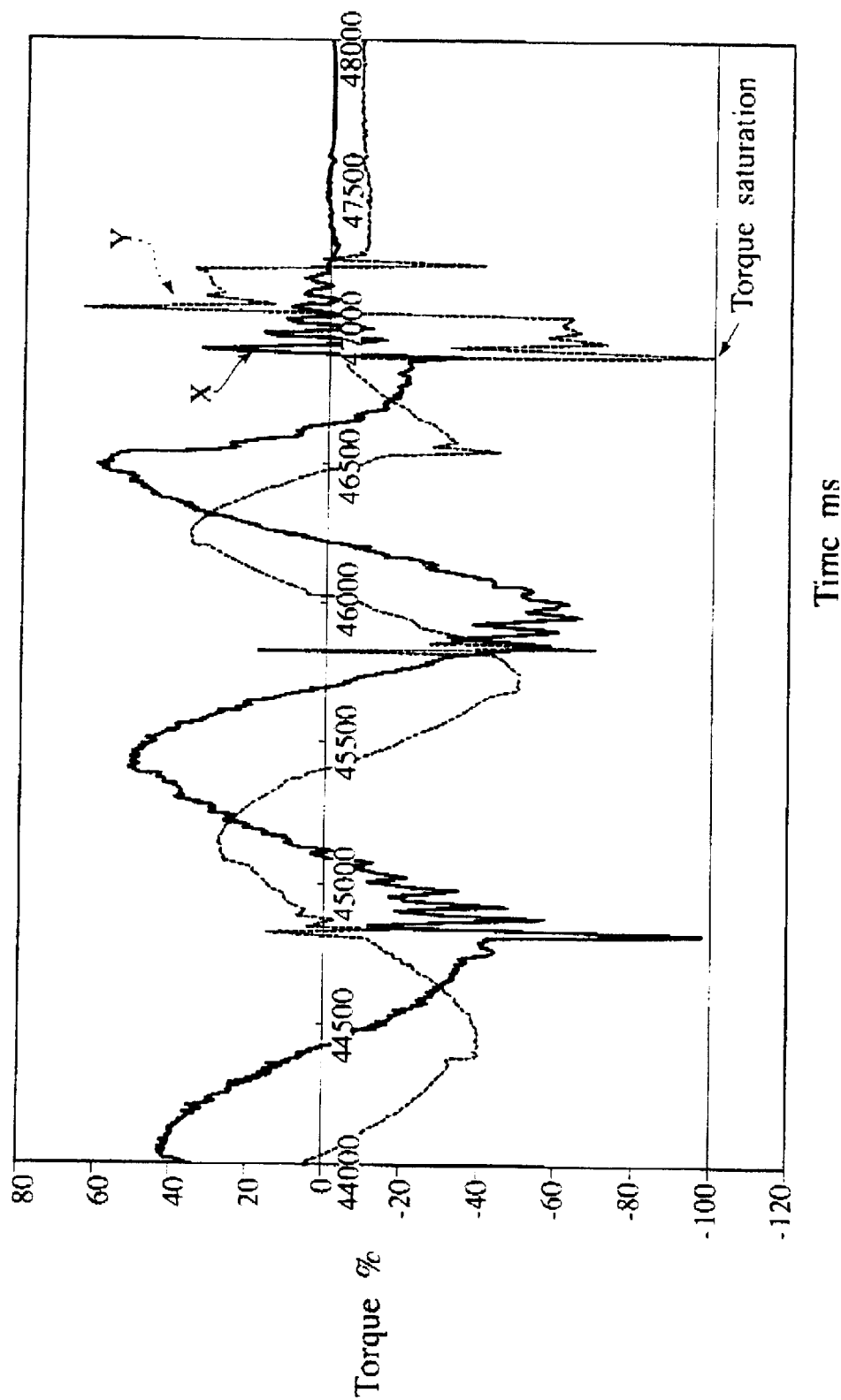
FIG. 7 is a graph showing, as waveforms, varying magnitudes of torque before the limitation of maximum cut-in speed and maximum cut-in acceleration in the orbit boring.

FIG. 7 shows, as observed waveforms, time-dependent variations in magnitudes of torque associated with the X and Y feeds of FIG. 4. Respective waveforms reached a torque saturation line.

Figure 8:
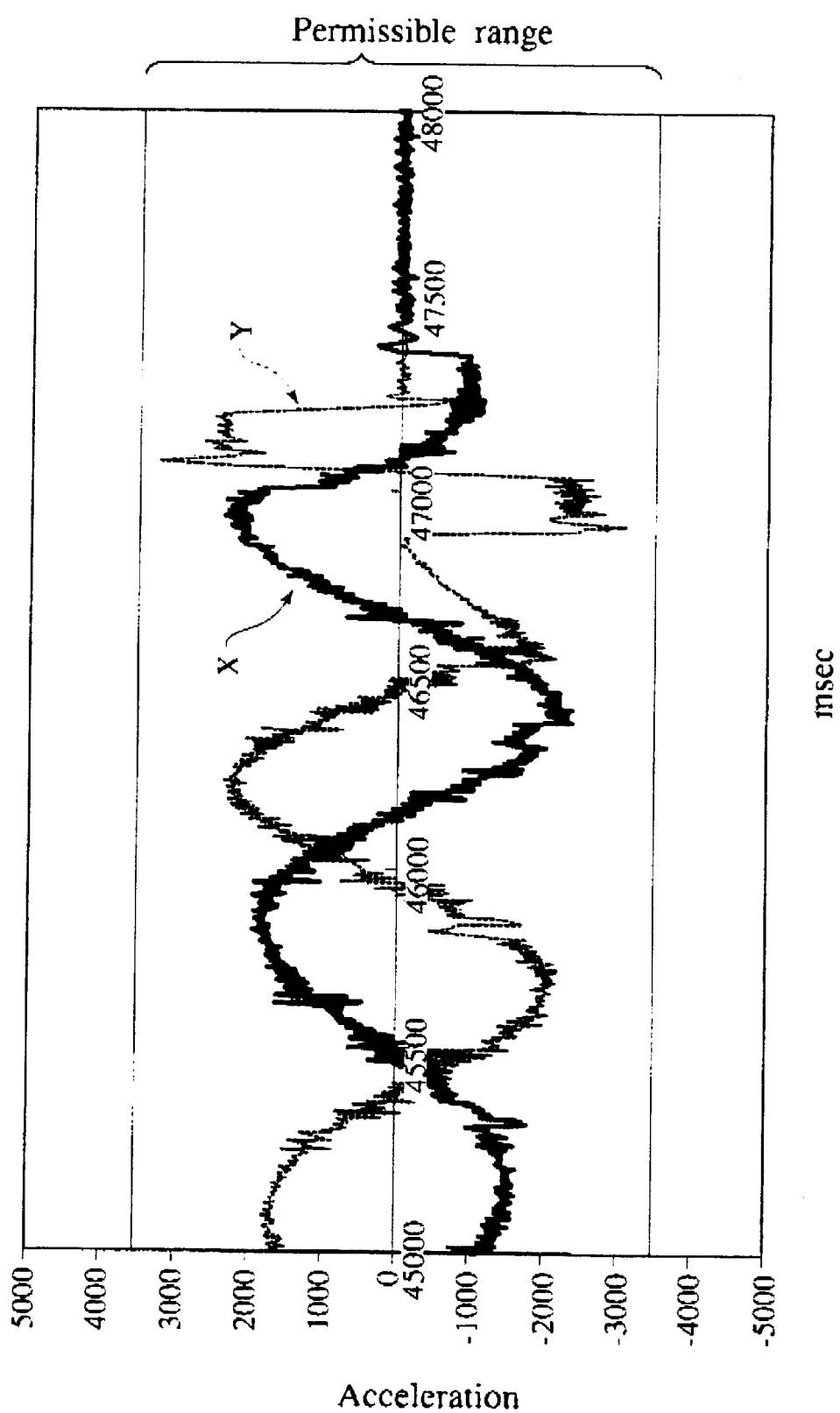
FIG. 8 is a graph showing, as waveforms, varying accelerations after the limitation of maximum cut-in speed and maximum cut-in acceleration in the orbit boring.

FIG. 8 shows, as observed waveforms, time-dependent variations of accelerations of X and Y feeds in a continued orbit boring with effected limitation according to the embodiment. Respective waveforms were limited within a permissible range.

Figure 9:
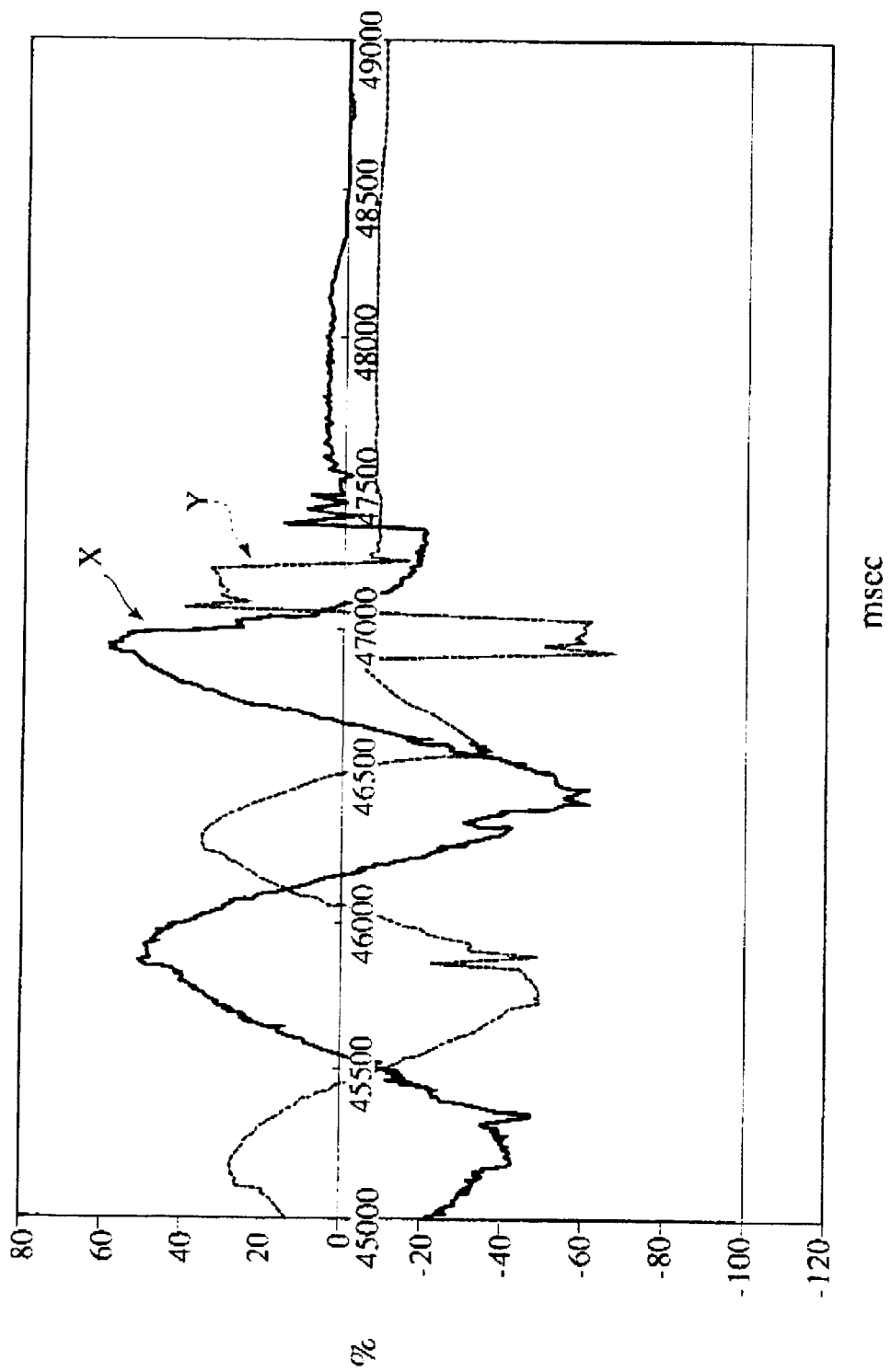
FIG. 9 is a graph showing, as waveforms, warning magnitudes of torque after the limitation of maximum cut-in speed and maximum cut-in acceleration in the orbit boring.

FIG. 9 shows, as observed waveforms, time-dependent variations in magnitudes of torque associated with the X and Y feeds of FIG. 8. Respective waveforms were limited to be substantially insignificant.

While the limitations of the maximum cut-in speed and maximum cut-in acceleration are not effectively performed in orbit boring, the acceleration exceeds the permissible range shown in FIG. 6, and a torque saturation occurs as shown in FIG. 7. However, when the limitations of the maximum cut-in speed and maximum cut-in acceleration are appropriately performed within the permissible maximum velocity Vnp and permissible maximum acceleration $_\alpha np$, the acceleration is kept within the permissible range as shown in FIG. 8, and no torque saturation occurs, as shown in FIG. 9.

This eliminates a work error due to $_\alpha$transitional error at the orbit boring and a decrease in quality of work surface, and prevents the sudden stop due to the torque saturation and generation of shock and an impulsive sound.

In the case where the numerical controller having a function to read the machining program ahead is used, the machining program is read beforehand and the command of the machining program read ahead is an orbit boring in a spindle position control mode, the feed velocity Vt and the orbit radius Ro at the time of the radial operation in the orbit boring described in the machining program are read ahead from the machining program every command of the machining program. Then, by referring to the maximum velocity Vm of the control axis and maximum acceleration $_\alpha$m there as factory-set mechanical specifications, which were parametrically set beforehand, the radial maximum velocity Vnp and maximum acceleration $_\alpha$np at the orbit boring are calculated from expressions (13), (7), and (15) in the numerical controller. Thus, this makes it possible to change the cut-in speed Vn, the acceleration $_\alpha$n, the linear acceleration or the deceleration time constant Tn so that the cut-in speed Vn does not exceed the radial maximum velocity Vnm and the acceleration $_\alpha$n at the cut-in time does not exceed the radial acceleration $_\alpha$nm.

This prevents the feed velocity of the control axis Ad the acceleration thereof from exceeding the maximum feed velocity Vm and the maximum acceleration $_\alpha$m on mechanical specifications by the minimum velocity limitation and acceleration limitation even if the radial operation is carried out for the purpose of the cut-in or escape operation in orbit boring.

Additionally, in the case where the description of the machining program is based on the machining radius R, the orbit radius Ro can be calculated by calculation using the expression that the work radius (R−Rt) is equal to Ro since the tool length Rt is a known value.

Figure 10:
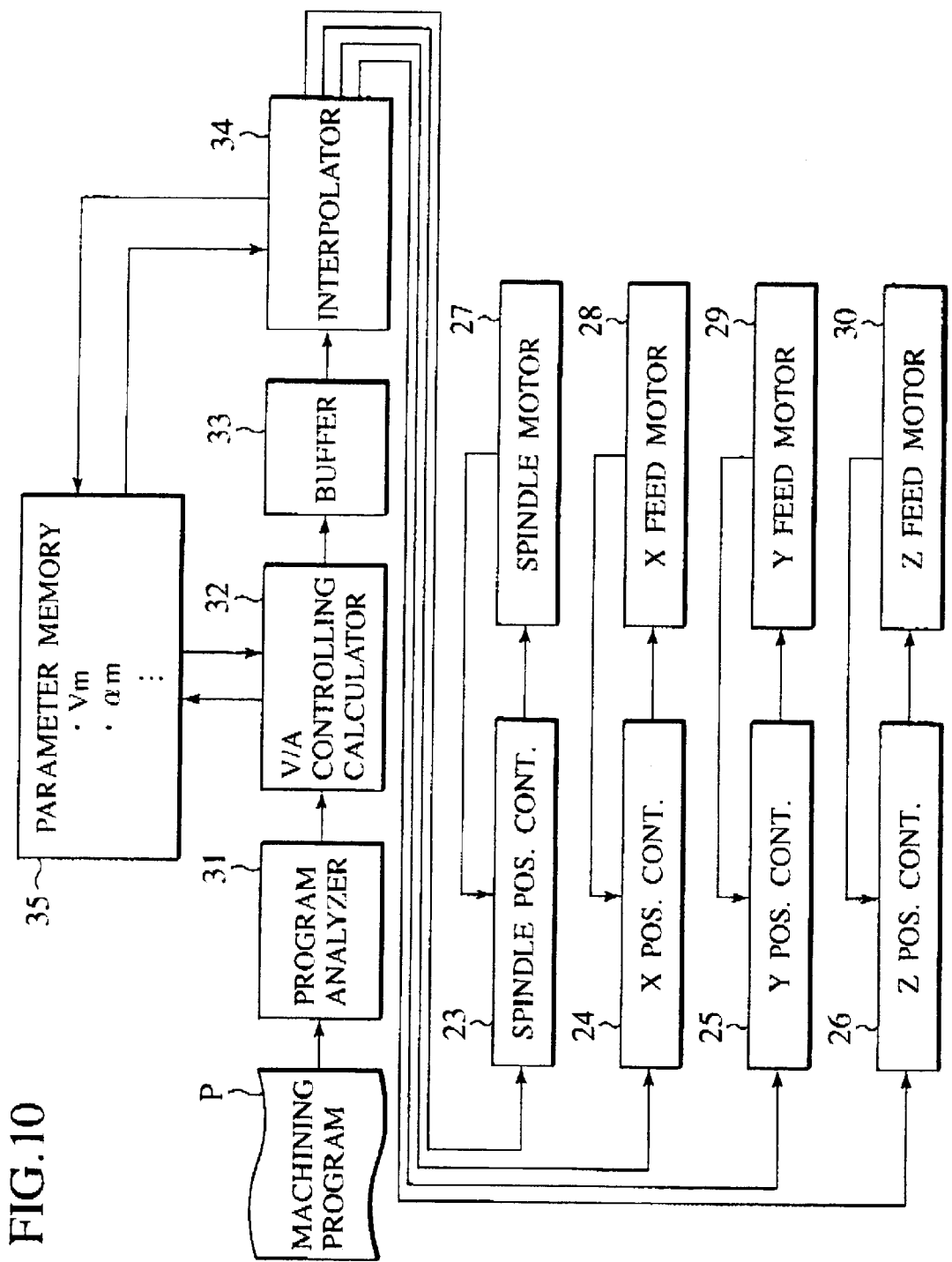
FIG. 10 is a block diagram of a numerical controller according to another embodiment of the invention.

FIG. 10 shows an embodiment of the numerical controller CNT which performs pre-reading. In FIG. 10, portions corresponding to FIG. 3 are denoted by the same reference numerals used in FIG. 3, and the descriptions for them are omitted.

This numerical controller includes a machining program analyzer 31 that reads the input machining program P ahead and analyzes the read machining program P to interpolation data for each block, a feed velocity/acceleration adjustment calculator 32, a buffer memory 33 that temporarily stores data relating to the program read ahead, an interpolator 34 that performs interpolation calculation to output a position command (velocity command) of each control axis, and a parameter memory 35 that stores various kinds of parameters necessary for feed velocity and acceleration adjustment calculation and interpolation calculation and parameter setting values of the maximum feed velocity Vm of the control axis and the maximum acceleration c, m thereof, which are set on mechanical specifications. Additionally, this numerical controller is also computerized, and the machining program analyzer 31 and the feed velocity and acceleration adjustment calculator 32 and the interpolator 34 are implemented for the computer to execute the program.

In addition, a value, which is determined by multiplying the calculation result by a safety ratio (for example, 0, 8), is substituted for the above maximum acceleration $_\alpha$m.

In the case where the machining program read ahead is an orbit boring, the feed velocity and acceleration adjustment calculator 32 calculates the radial maximum velocity Vnm and the maximum acceleration $_\alpha$nm at the orbit boring by the expressions (13), (7), and (15) from the maximum feed velocity Vm and the maximum acceleration $_\alpha$m of the control axis on mechanical specifications which are parametrically set to the parameter memory 35 and as well as from the feed velocity Vt of the orbit boring command and the orbit radius Ro. Then, the feed velocity and deceleration adjustment calculator 32 calculates the cut-in speed Vn, the acceleration $_\alpha$n or the linear acceleration or deceleration time constant Tn and sets them thereinto to prevent the cut-in speed Vn from exceeding the radial maximum velocity Vnm and to prevent the acceleration $_\alpha$n at the cut-in time from exceeding the acceleration $_\alpha$nm. Such date is temporarily stored in the buffer memory 33.

The interpolator 34 calculates the moving quantity of each control axis from interpolation data for each block. In the case of the orbit boring, the interpolator 34 calculates the positron command (velocity command) according to the cut-in speed Vn, the acceleration $_\alpha$n or the linear acceleration or deceleration time constant Tn which are temporarily stored in the buffer memory 33.

The position command (velocity command) output by the interpolator 34 is input to the position controllers 23, 24, 25 and 26 of the respective control axes.

Figure 11:
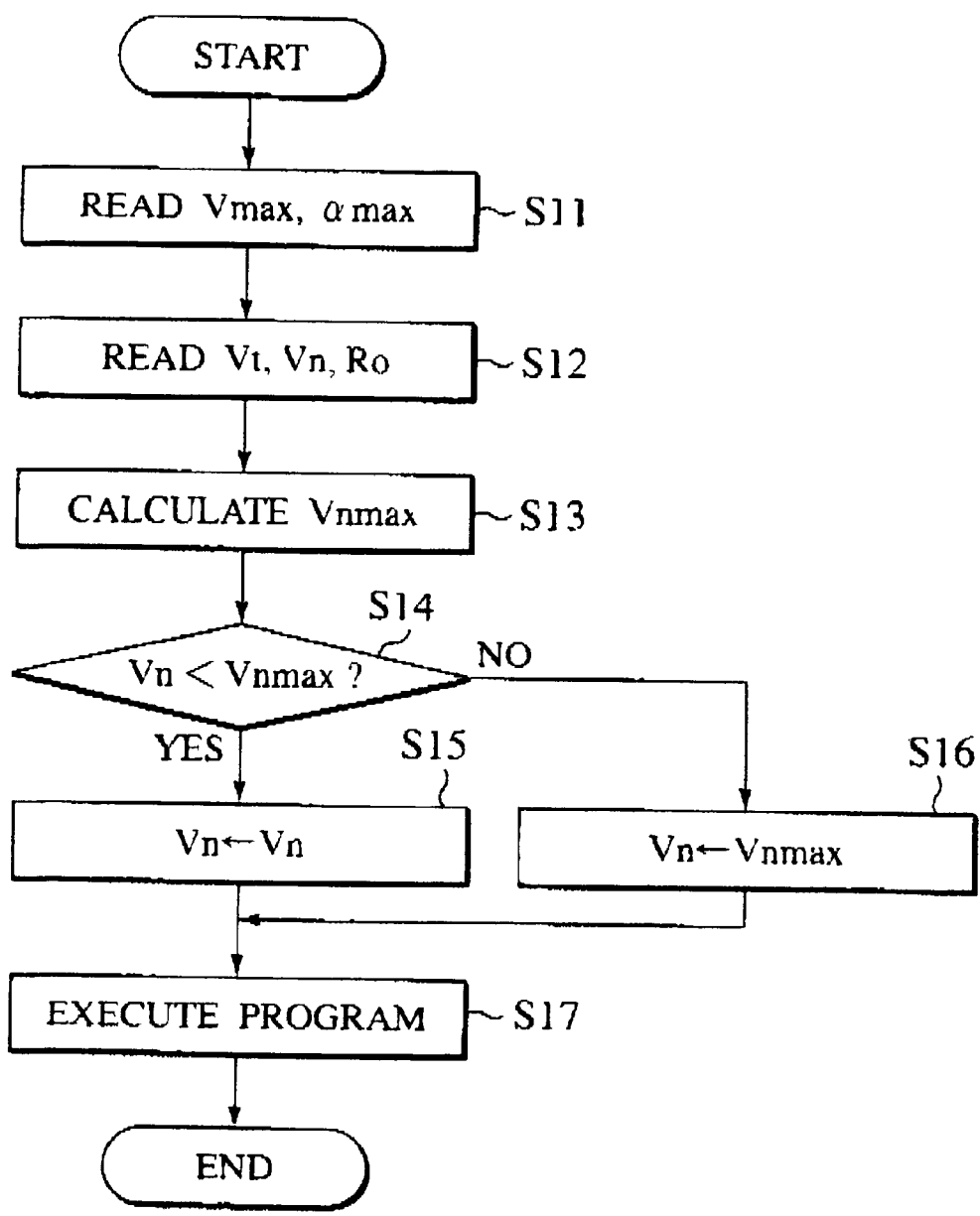
FIG. 11 is a flowchart of a cut-in speed setup procedure in a numerical control method for NC machine tools according to an embodiment of the invention.

The cut-in speed setting steps in this case are explained with reference to the flowchart shown in FIG. 11

First, the maximum feed velocity Vm (written Vmax in FIG. 11 for comprehension) and the maximum acceleration $_\alpha$m (written $_\alpha$max in FIG. 11 for comprehension) of the control axis (e.g. X axis) on mechanical specifications, which have been parametrically set, are determined from the parameter memory (step S11).

Next, the machining program is read ahead, and the teed velocity Vt, cut-in speed Vn and orbit radius Ro of the orbit boring command are acquired from the machining program previously read (step S12). In addition, the orbit radius Ro can be calculated by calculation of machining radius R−Rt since the tool length Rt is a known value.

Sequentially, the radial maximum velocity Vnm (written Vnmax in FIG. 11 for comprehension) at the cut-in time is calculated by the aforementioned expression (7) using the maximum feed velocity Vm, the feed velocity Vt, the orbit radius Ro and the like (step S13).

Then, it is decided whether or not the cut-in speed Vn of the orbit boring command is equal to the maximum velocity Vnm or less (step S14). When it is decided that V<Vnm is established, the cut-in speed Vn of the orbit boring command is applied as it is (step S15). While, when it is decided that V<Vnm is not established, the cut-in speed Vn is changed (limited) to Vnm (step S16).

After that, the program is executed (step S17), so that the cut-in speed Vn in orbit boring is suppressed to the maximum velocity Vnm, and it is avoided that the feed velocity of the control axis exceeds the maximum feed velocity Vm on mechanical specifications in orbit boring.

Besides the aforementioned control, the velocity pattern relating to the radial operation in orbit boring is set to a pattern whose velocity change is; smooth, e.g., S-shape and the like in the interpolation stage, and it is also possible to suppress the acceleration of the radial operation in orbit boring.

Figure 12:
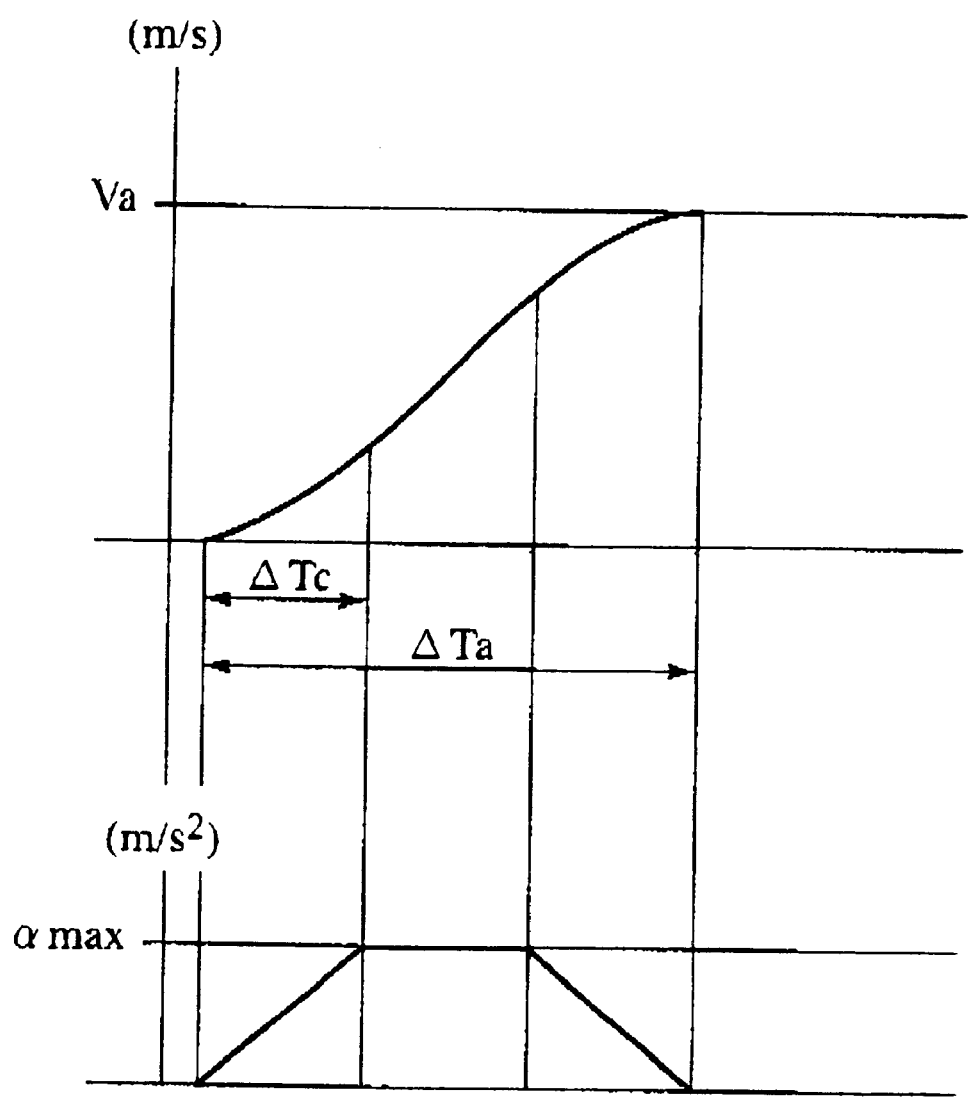
FIG. 12 is a graph of a velocity waveform and an acceleration/deceleration waveform in a velocity control by an S-velocity pattern.

In the case of an X-Y plane orbit, the X component of acceleration becomes a maximum level at angle θ=0° (if λ=Ro cos θ, then $_\alpha$λ=−Ro(θ/t)$^2$ cos θ). In the case where the orbit boring is carried out at the maximum acceleration on mechanical specifications, the acceleration $_\alpha$ must be zero in the radial operation at θ=0°. For this reason, the acceleration or deceleration operation is carried out using an S-shaped acceleration or deceleration time constant An acceleration or deceleration pattern using an S-shaped acceleration or deceleration time constant is shown in FIG. 12.

The relationship between a curved line portion time ΔTc and an acceleration and deceleration entire time ΔTa in an S-shaped velocity pattern can be expressed by the following expression (17) if an acceleration target velocity Va and a maximum acceleration $_\alpha$m are decided.

$$\Delta Ta = (Va/_\alpha m) + \Delta Tc \qquad (17),$$

where $\Delta Tc \leq (Va, {}_\alpha m)$.

Accordingly, if the curved line portion time $\Delta Tc$ is decided, the entire time $\Delta Ta$ can be determined.

Moreover, besides the above, it is also possible to limit the acceleration of the radial operation in orbit boring for each angle $\theta$.

In the orbit boring, since a feeding system is caused to perform a circular interpolation expressed by the following expressions (18) and (19), acceleration results in the expressions (20), and (21) and the limitation of acceleration of each control axis can be given by the expressions (22) and (23):

$$X = Ro \cos \omega t \tag{18},$$

where $\omega = \theta/t$, $$Y = Ro \sin \omega t \tag{19},$$

$${}_\alpha X = -Ro\omega^2 \cos \omega t \tag{20},$$

$${}_\alpha Y = -Ro\omega^2 \sin \omega t \tag{21},$$

$${}_\alpha X = |{}_\alpha m| - |-Ro\omega^2 \cos \omega t| \tag{22}, \text{ and}$$

$${}_\alpha Y = |{}_\alpha m| - |-Ro\omega^2 \sin \omega t| \tag{23}.$$

For this reason, it is possible to limit acceleration for each angle in starting the radial operation in the radial operation in orbit boring.

Moreover, since synthetic acceleration of two axes in the orient boring can be always given by the following expression (24), the limitations of synthetic acceleration at an arbitrary angle $\gamma$ can be given by the following expression (25):

$$_\alpha 0 = -Ro\omega^2 \tag{24, and}$$

$$|\alpha XY| = |\alpha m| - |\alpha o| \tag{25}.$$
$$= |\alpha XY \cos^2 \gamma + \alpha XY \sin^2 \gamma|$$

Accordingly, the synthetic acceleration of two axes is limited by the moving direction (angle).

In addition, the numerical control method of the numerical control machine tool and the numerical controller according to the present invention is not limited to the orbit boring, and is useful in working by various kinds of contour describing controls using circular interpolation, namely work in which radii velocity is added to the feed velocity of control axis.

As will be understood from the foregoing description, according to the embodiments described, the numerical control method of the numerical control machine tool and the numerical controller of the present invention, since control is performed so as not to exceed allowable velocity and acceleration on mechanical specifications in the case where the transitional operation by radial operation such as cut-in operation in working by contour describing control of varies kinds using circular interpolation such as orbit boring. Accordingly, it is possible to acquire effects of removing the working error due to the remaining vibration of transitional error, the reduction in the quality of the work surface, sudden Stop due to the torque saturation, shock and impulsive sound.

According to the embodiments, a numerical control method for a numerical control machine tool comprises the steps of: previously setting a radial maximum velocity or maximum acceleration at a-contour describing control time using circular interpolation separately from a setting value of a maximum feed velocity of a control axis and that of a maximum acceleration thereof set on mechanical specifications; and adding limitations to a radial velocity or maximum acceleration at a circular interpolation instructing time so that the radial velocity or the maximum acceleration does not exceeds the radial maximum velocity or the maximum acceleration previously set.

According to the embodiments, a numerical control method for a numerical control machine tool comprises the steps of: reading a machining program ahead; leading a feed velocity and a work radius from the machining program when an command of a contour describing control by a circular interpolation is issued; calculating a radial maximum velocity and a maximum acceleration at a contour describing control time from the read feed velocity and work radius and a setting value of a maximum feed velocity of a control axis and that of a maximum acceleration thereof, which are set on mechanical specifications; and adding limitations to the radial velocity or the maximum acceleration so that the radial velocity or the maximum acceleration does not exceed the calculated radial maximum velocity or the maximum acceleration.

According to the embodiments, therefore, even if the radial operation is carried out for the purpose of the cut-in or escape operation, the teed velocity of the control axis and the acceleration thereof are prevented from exceeding the maximum feed velocity and the maximum acceleration on mechanical specifications by the radial velocity limitation and acceleration limitation.

According to the embodiments, a numerical control method for a numerical control machine tool can set a radical velocity pattern at a contour describing control time using a circular interpolation to an S-shaped pattern; and can suppress an acceleration of a radial operation to be equal to a maximum acceleration of a control axis or less set for the machine.

The numerical control method for a numerical control machine tool according to the embodiments can set an acceleration of a radical operation at a contour describing control time using a circular interpolation in accordance with an angle from an origin of a normal two-axis plane; and can suppress the acceleration of the radial operation to be equal to a maximum acceleration of a control axis or less set for the machine.

Furthermore, according to the embodiments, a numerical controller for a machine tool comprises a setter for previously setting a radial maximum velocity and a maximum acceleration at a contour describing control time using circular interpolation separately from a setting value of a maximum feed velocity of a control axis and that of a maximum acceleration thereof set on mechanical specifications; and a limiter for adding limitations to a radial velocity and a maximum acceleration when an command of a circular interpolation is issued so that the radial velocity and the maximum acceleration do not exceed the radial maximum velocity and the maximum acceleration which are previously set.

According to the embodiments, a numerical controller for a machine tool, which has a function to read a machining program ahead, comprises: a calculator for reading a feed velocity and a work radius from the machining program when an command of a contour describing control by a circular interpolation is issued and for calculating a radial maximum velocity and a maximum acceleration at a contour describing control time from the read feed velocity and work radius and a setting value of a control axis and that of a maximum acceleration thereof set on mechanical specification; and a limiter for adding limitations to a radial velocity or a maximum acceleration so that the radial velocity or the maximum acceleration does not exceed the radial maximum velocity and the maximum acceleration which are calculated.

A preferable contour describing control using the circular interpolation in the numerical control method for a machine tool and the apparatus of the same is a control of turning for performing boring by synchronously controlling a circular interpolatory movement about a spindle in a plane perpendicular to the spindle and a rotational movement of the man axis so that a tool mounted on the spindle is always directed to an arc radial normal direction.

Although preferred embodiments of the present invention have been described with specific terms, the description is for illustrative purpose, and variations or modifications thereof may be made by those skilled in the ant, without departing from the spirit or scope of the following claims.

What is claimed is:

1. A numerical control method for NC machine tools to perform a contour describing control, comprising:
    calculating a permissible range of a physical index representing one of a velocity and an acceleration of a tool; and
    controlling the physical index within the permissible range, wherein the controlling the physical index comprises:
        analyzing a program block of a machining program of the contour describing control to obtain data on a control block of the contour describing control associated with the program block,
        processing the obtained data to predict the physical index in the control block, and
        processing the predicted physical index to be compared with the permissible range.

2. A numerical control method according to claim 1, wherein the permissible range is involved within a factory-set maximum range of the physical index.

3. A numerical control method according to claim 1, wherein the velocity has a normal component thereof normal to an orbit of the contour describing control and variable depending on an S pattern, and the physical index represents a normal component of the acceleration normal to the orbit.

4. A numerical control method according to claim 1, wherein the acceleration has a normal component thereof normal to an orbit of the contour describing control and variable depending on an angle of rotation of the tool, and the physical index represents the normal component of the acceleration.

5. A numerical control method according to claim 1, wherein the one of the velocity and the acceleration is determined based on the motion of a su supporting part of the tool.

6. A numerical controller for NC machine tools to perform a contour describing control, comprising:
    a calculator for calculating a permissible range of a physical index representing one of a velocity and an acceleration of a tool; and
    a controller for controlling the physical index within the permissible range, wherein the controller comprises:
        an analyzer for analyzing a program block of a machining program of the contour describing control to obtain data on a control block of the contour describing control associated with the program block,
        a predicting processor for processing the obtained data to predict the physical index in the control block, and
        a comparing processor for processing the predicted physical index to be compared with the permissible range.

7. A numerical controller according to claim 6, wherein the permissible range is involved within a factory-set maximum range of the physical index.

8. A numerical controller according to claim 6, wherein the velocity has a normal component thereof normal to an orbit of the contour describing control and variable depending on an S pattern, and the physical index represents a normal component of the acceleration normal to the orbit.

9. A numerical controller according to claim 6, wherein the acceleration has a normal component thereof normal to an orbit of the contour describing control and variable depending on an angle of rotation of the tool, and the physical index represents the normal component of the acceleration.

10. A numerical control method according to claim 6, wherein the one of the velocity and the acceleration is determined based on the motion of a supporting part of the tool.

11. A numerical control method for NC machine tools to perform a contour describing control, comprising:
    calculating a permissible range of a physical index representing one of a velocity and an acceleration of a tool, wherein the velocity has a normal component thereof normal to an orbit of the contour describing control and variable depending on an S pattern and the physical index represents a normal component of the acceleration normal to the orbit; and
    controlling the physical index within the permissible range.

12. A numerical control method for NC machine tools to perform a contour describing control, comprising:
    calculating a permissible range of a physical index representing one of a velocity and an acceleration of a tool, wherein the acceleration has a normal component thereof normal to an orbit of the contour describing control and variable depending on an angle of rotation of the tool, and the physical index represents the normal component of the acceleration; and
    controlling the physical index within the permissible range.

13. A numerical controller for NC machine tools to perform a contour describing control, comprising:
    a calculator for calculating a permissible range of a physical index representing one of a velocity and an acceleration of a tool, wherein the velocity has a normal component thereof normal to an orbit of the contour describing control and variable depending on an S pattern, and the physical index represents a normal component of the acceleration normal to the orbit; and
    a controller for controlling the physical index within the permissible range.

14. A numerical controller for NC machine tools to perform a contour describing control, comprising:
    a calculator for calculating a permissible range of a physical index representing one of a velocity and an acceleration of a tool, wherein the acceleration has a normal component thereof normal to an orbit of the contour describing control and variable depending on an angle of rotation of the tool, and the physical index represents the normal component of the acceleration; and
    a controller for controlling the physical index within the permissible range.

* * * * *

UNITED STATES PATENT AND TRADEMARK OFFICE
CERTIFICATE OF CORRECTION

PATENT NO. : 6,728,595 B2
DATED : April 27, 2004
INVENTOR(S) : Minoru Hamamura et al.

It is certified that error appears in the above-identified patent and that said Letters Patent is hereby corrected as shown below:

Column 17,
Line 44, delete "su" before "supporting".

Signed and Sealed this

Twentieth Day of July, 2004

JON W. DUDAS
*Acting Director of the United States Patent and Trademark Office*